United States Patent
Landis et al.

(10) Patent No.: US 12,512,906 B2
(45) Date of Patent: Dec. 30, 2025

(54) REPEATER LEAKAGE REPORTS

(71) Applicant: QUALCOMM Incorporated, San Diego, CA (US)

(72) Inventors: Shay Landis, Hod Hasharon (IL); Idan Michael Horn, Hod Hasharon (IL); Amit Bar-Or Tillinger, Tel-Aviv (IL); Yehonatan Dallal, Kfar Saba (IL)

(73) Assignee: Qualcomm Incorporated, San Diego, CA (US)

( * ) Notice: Subject to any disclaimer, the term of this patent is extended or adjusted under 35 U.S.C. 154(b) by 414 days.

(21) Appl. No.: 18/318,414

(22) Filed: May 16, 2023

(65) Prior Publication Data

US 2024/0388359 A1 Nov. 21, 2024

(51) Int. Cl.
*H04B 7/185* (2006.01)
*H04W 24/10* (2009.01)

(52) U.S. Cl.
CPC ........ *H04B 7/18519* (2013.01); *H04W 24/10* (2013.01)

(58) Field of Classification Search
CPC ................. H04B 7/15–17; H04B 7/18519; H04W 24/10
See application file for complete search history.

(56) References Cited

U.S. PATENT DOCUMENTS

| 2012/0314647 | A1* | 12/2012 | Gore | H04B 7/15542 370/315 |
| 2013/0034128 | A1* | 2/2013 | Gore | H04B 7/15585 375/211 |
| 2016/0192208 | A1* | 6/2016 | Zierdt | H04W 72/00 370/315 |
| 2018/0159611 | A1* | 6/2018 | Majmundar | H04L 47/38 |
| 2023/0022787 | A1* | 1/2023 | Lamba | G06F 16/245 |

* cited by examiner

*Primary Examiner* — Raymond S Dean
(74) *Attorney, Agent, or Firm* — Harrity & Harrity, LLP

(57) ABSTRACT

Various aspects of the present disclosure generally relate to wireless communication. In some aspects, a repeater device may transmit a repeater leakage report that indicates one or more signal leakage metrics associated with the repeater device. The repeater device may receive an indication of gain configuration information that is associated with a respective gain configuration for each respective pass-through signal of one or more pass-through signals associated with the repeater device. Numerous other aspects are described.

30 Claims, 9 Drawing Sheets

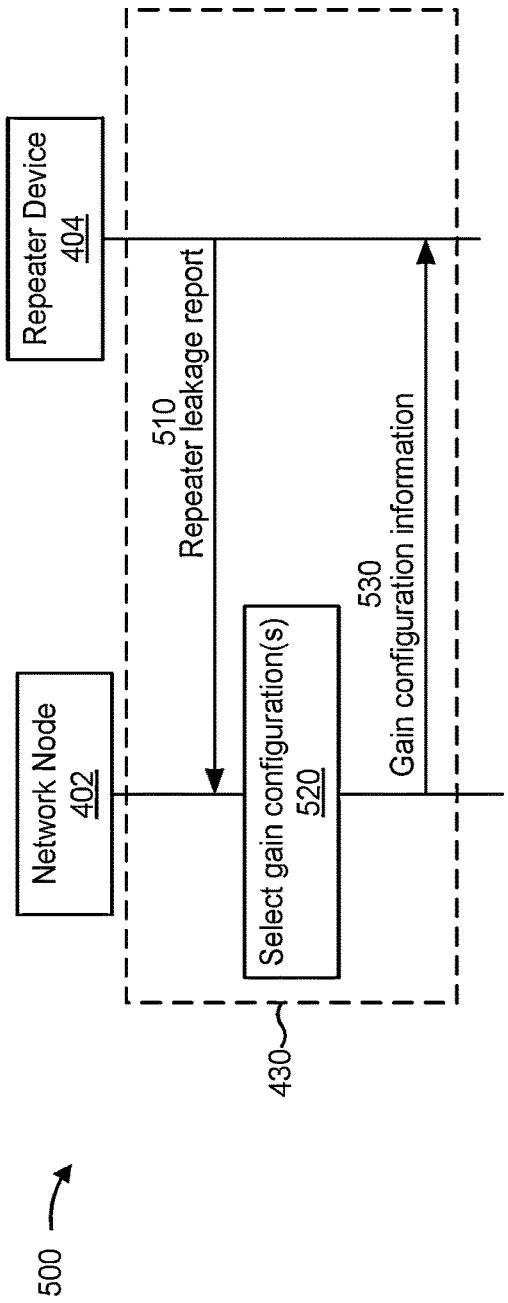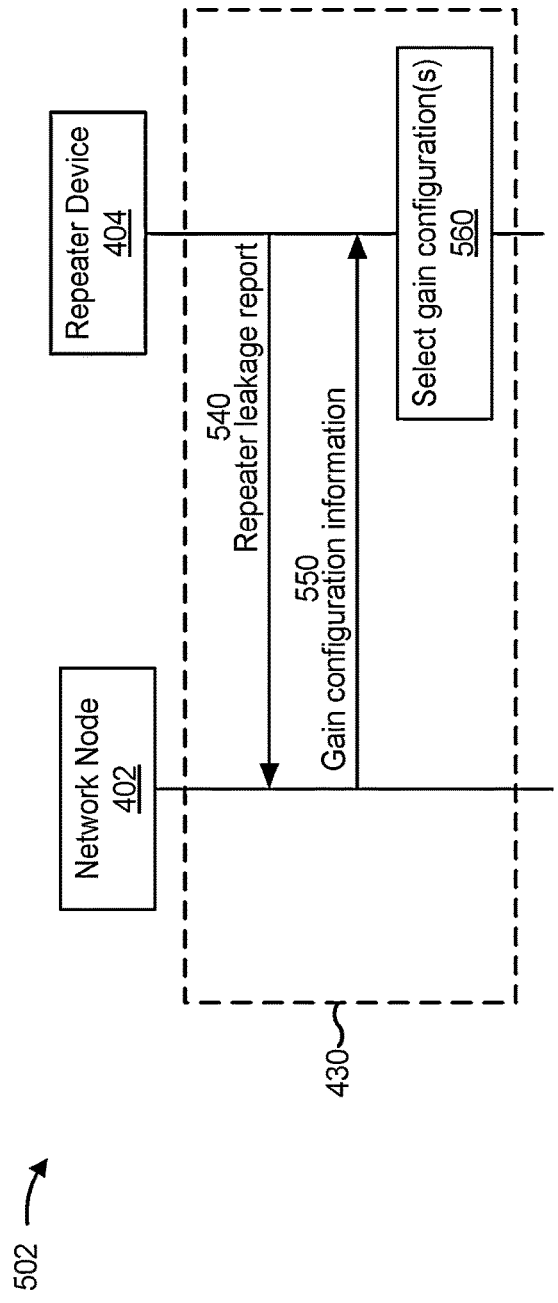

REPEATER LEAKAGE REPORTS

FIELD OF THE DISCLOSURE

Aspects of the present disclosure generally relate to wireless communication and to techniques and apparatuses for repeater leakage reports.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a repeater device. The method may include transmitting a repeater leakage report that indicates one or more signal leakage metrics associated with the repeater device. The method may include receiving an indication of gain configuration information that is associated with a respective gain configuration for each respective pass-through signal of one or more pass-through signals associated with the repeater device.

Some aspects described herein relate to a method of wireless communication performed by a network node. The method may include receiving a repeater leakage report that indicates one or more signal leakage metrics associated with a repeater device. The method may include transmitting an indication of gain configuration information that is based at least in part on the repeater leakage report, the gain configuration information being associated with a respective gain configuration for one or more pass-through signals associated with the repeater device.

Some aspects described herein relate to an apparatus for wireless communication at a repeater device. The apparatus may include a memory and one or more processors coupled to the memory. The one or more processors may be configured to transmit a repeater leakage report that indicates one or more signal leakage metrics associated with the repeater device. The one or more processors may be configured to receive an indication of gain configuration information that is associated with a respective gain configuration for each respective pass-through signal of one or more pass-through signals associated with the repeater device.

Some aspects described herein relate to an apparatus for wireless communication at a network node. The apparatus may include a memory and one or more processors coupled to the memory. The one or more processors may be configured to receive a repeater leakage report that indicates one or more signal leakage metrics associated with a repeater device. The one or more processors may be configured to transmit an indication of gain configuration information that is based at least in part on the repeater leakage report, the gain configuration information being associated with a respective gain configuration for one or more pass-through signals associated with the repeater device.

Some aspects described herein relate to a non-transitory computer-readable medium that stores a set of instructions for wireless communication by a repeater device. The set of instructions, when executed by one or more processors of the repeater device, may cause the repeater device to transmit a repeater leakage report that indicates one or more signal leakage metrics associated with the repeater device. The set of instructions, when executed by one or more processors of the repeater device, may cause the repeater device to receive an indication of gain configuration information that is associated with a respective gain configuration for each respective pass-through signal of one or more pass-through signals associated with the repeater device.

Some aspects described herein relate to a non-transitory computer-readable medium that stores a set of instructions for wireless communication by a network node. The set of instructions, when executed by one or more processors of the network node, may cause the network node to receive a repeater leakage report that indicates one or more signal leakage metrics associated with a repeater device. The set of instructions, when executed by one or more processors of the network node, may cause the network node to transmit an indication of gain configuration information that is based at least in part on the repeater leakage report, the gain configuration information being associated with a respective gain configuration for one or more pass-through signals associated with the repeater device.

Some aspects described herein relate to an apparatus for wireless communication. The apparatus may include means for transmitting a repeater leakage report that indicates one or more signal leakage metrics associated with the apparatus. The apparatus may include means for receiving an indication of gain configuration information that is associated with a respective gain configuration for each respective pass-through signal of one or more pass-through signals associated with the apparatus.

Some aspects described herein relate to an apparatus for wireless communication. The apparatus may include means for receiving a repeater leakage report that indicates one or more signal leakage metrics associated with a repeater device. The apparatus may include means for transmitting an indication of gain configuration information that is based at least in part on the repeater leakage report, the gain configuration information being associated with a respective gain configuration for one or more pass-through signals associated with the repeater device.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams illustrating a first example and a second example, respectively, of a wireless communication process between the network node and the repeater device as described with regard to FIG. 4, in accordance with the present disclosure.

DETAILED DESCRIPTION

Figure 1:
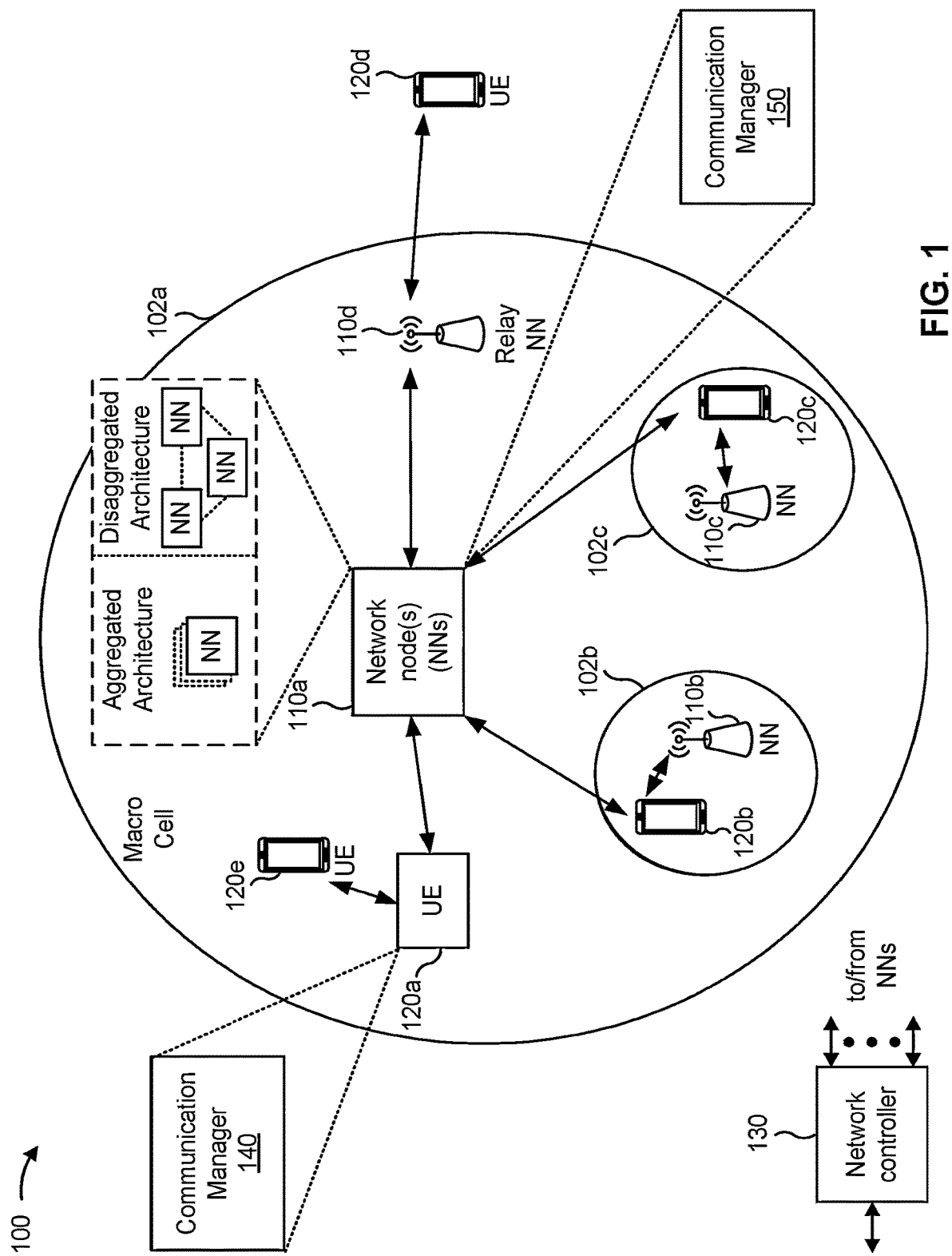
FIG. 1 is a diagram illustrating an example of a wireless network, in accordance with the present disclosure.

Beamforming and/or millimeter waves (mmWaves) may provide increased data throughput relative to lower frequencies when a transmitter operates in a line-of-sight (LoS) condition with a receiver, but may be more susceptible to disruption by an obstruction and/or blockage that obscures the LoS condition between the devices (transmitter and receiver). Some wireless links may include an intermediary device to mitigate the obstructions, such as a repeater device that amplifies and/or redirects pass-through signals. However, too much power amplification applied by a repeater device to one or more repeated signals may result in oscillation and/or feedback that forms a positive loop between an output of the repeater device and an input of the repeater device. To illustrate, oscillation may occur at a repeater device when at least a portion of a first repeated signal that is transmitted by the repeater device leaks into a second signal received by the repeater device and passed through the repeater device again.

Different beam pairs, different frequencies, and/or different repeater devices may have different gain bounds and/or oscillation thresholds for mitigating oscillation. As one example, different repeater devices may utilize different hardware configurations that provide different levels of signal isolation for a same set of beams. As another example, beams at different frequencies may have different spatial beamwidths that result in different amounts of signal leakage. Without knowledge of how different beam configurations and/or hardware configurations affect signal leakage at a repeater device and, subsequently, varying oscillation thresholds to mitigate oscillation, a network node may instruct a repeater device to apply a gain configuration that results in oscillation at the repeater device. The oscillation may result in reduced signal quality (e.g., increased signal leakage and/or increased oscillation), increased recovery errors at a receiver, reduced data throughput, and/or increased data transfer latencies. Alternatively, or additionally, the oscillation may result in fewer pass-through signals at the repeater device (e.g., to reduce a number of beams at the repeater device) and, subsequently, fewer wireless links that may benefit from the repeater device.

Various aspects generally relate to repeater leakage reports. Some aspects more specifically relate to a network node and/or a repeater device selecting a repeater configuration that mitigates oscillation at the repeater device based at least in part on a repeater leakage report. A repeater device may transmit a repeater leakage report that indicates one or more signal leakage metrics that are associated with the repeater device. For instance, the repeater device may transmit, as a signal leakage metric, an amount of signal leakage associated with a beam pair and/or a maximum gain (e.g., a power amplifier bound and/or an oscillation gain threshold). Accordingly, each signal leakage metric may be associated with a respective beam pair, and the repeater leakage report may include a beam pair identifier associated with the signal leakage metric. The repeater device may receive an indication of gain configuration information that specifies a respective gain configuration for the pass-through signal(s) at the repeater device. As one example, the repeater device may receive the gain configuration information from a network node. In some aspects, the repeater device may apply the respective gain configuration(s), and the repeater device, using the respective gain configuration(s) to repeat the pass-through signals, may mitigate oscillation better, relative to other gain configurations.

By transmitting a repeater leakage report, a repeater device may indicate information to a network node that may enable the network node to select a repeater configuration (e.g., one or more gain configurations and/or one or more beam pairs) that mitigates oscillation at the repeater device. Alternatively, or additionally, the repeater device may select the repeater configuration based at least in part on mitigating oscillation and/or based at least in part on one or more operating bounds associated with the network node, such as a link budget. Mitigating oscillation at the repeater device may increase a signal quality (e.g., decreased signal leakage and/or decreased oscillation) of a repeated signal by the repeater device. The increased signal quality may result in decreased recovery errors at a receiver, increased data throughput, and/or decreased data transfer latencies. Alternatively, or additionally, mitigating the oscillation may increase a number of pass-through signals supported by the repeater device.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110)

may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a repeater device (e.g., a UE 120) may include a communication manager 140. As described in more detail elsewhere herein, the communication manager 140 may transmit a repeater leakage report that indicates one or more signal leakage metrics associated with the repeater device; and receive an indication of gain configuration information that is associated with a respective gain configuration for each respective pass-through signal of one or more pass-through signals associated with the repeater device. Additionally, or alternatively, the communication manager 140 may perform one or more other operations described herein.

In some aspects, a network node (e.g., the network node 110) may include a communication manager 150. As described in more detail elsewhere herein, the communication manager 150 may receive a repeater leakage report that indicates one or more signal leakage metrics associated with a repeater device; and transmit an indication of gain configuration information that is based at least in part on the repeater leakage report, the gain configuration information being associated with a respective gain configuration for one or more pass-through signals associated with the repeater device. Additionally, or alternatively, the communication manager 150 may perform one or more other operations described herein.

As indicated above, FIG. 1 is provided as an example. Other examples may differ from what is described with regard to FIG. 1.

Figure 2:
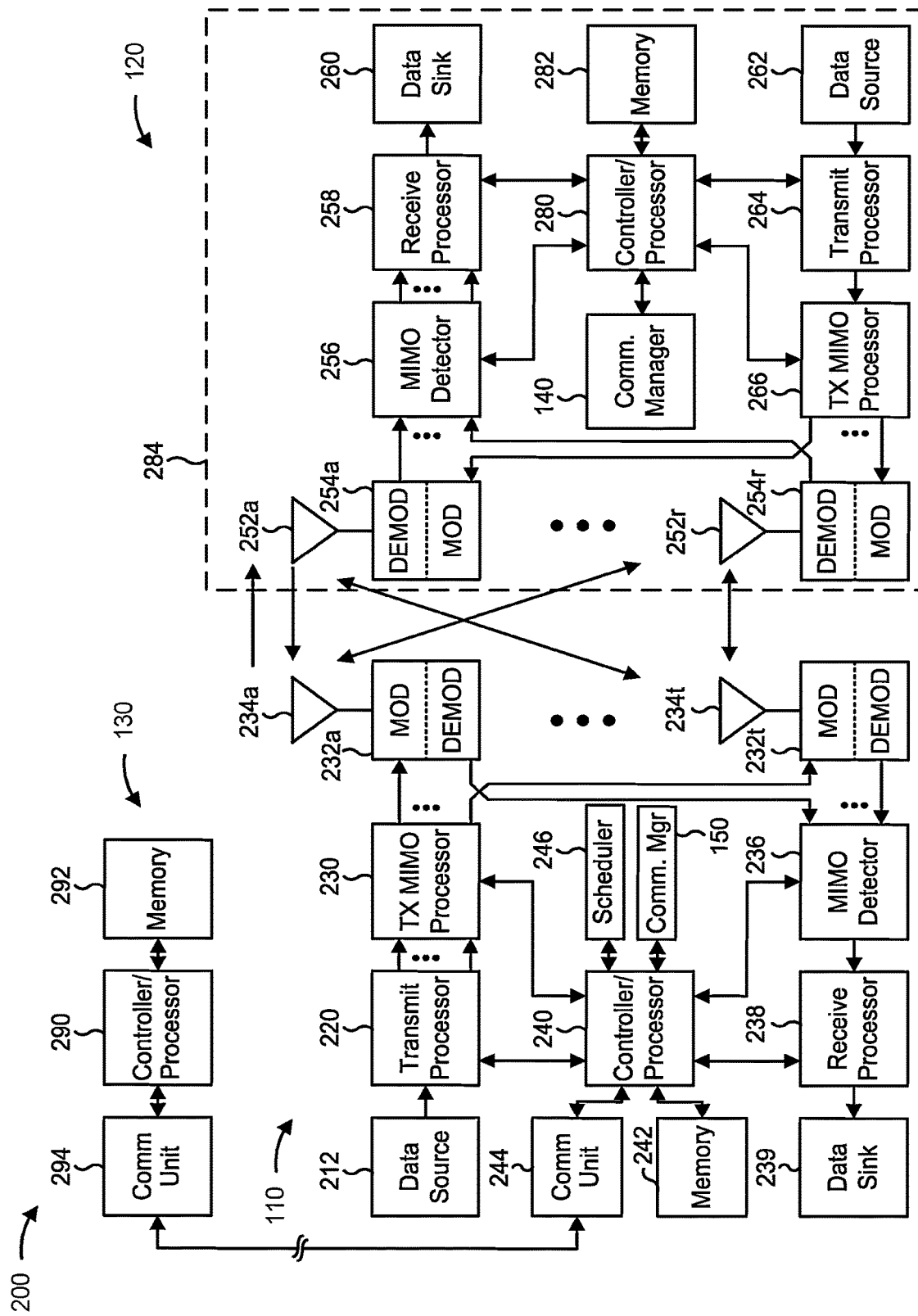
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate)

the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the network node 110, the controller/processor 280 of the UE 120, and/or any other component(s) of FIG. 2 may perform one or more techniques associated with repeater leakage reports, as described in more detail elsewhere herein. In some aspects, the repeater device described herein is the UE 120, is included in the UE 120, or includes one or more components of the UE 120 shown in FIG. 2. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a repeater device (e.g., a UE 120) includes means for transmitting a repeater leakage report that indicates one or more signal leakage metrics associated with the repeater device; and/or means for receiving an indication of gain configuration information that is associated with a respective gain configuration for each respective pass-through signal of one or more pass-through signals associated with the repeater device. In some aspects, the means for the repeater device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110) includes means for receiving a repeater leakage report that indicates one or more signal leakage metrics associated with a repeater device; and/or means for transmitting an indication of gain configuration information that is based at least in part on the repeater leakage report, the gain configuration information being associated with a respective gain configuration for one or more pass-through signals associated with the repeater device. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
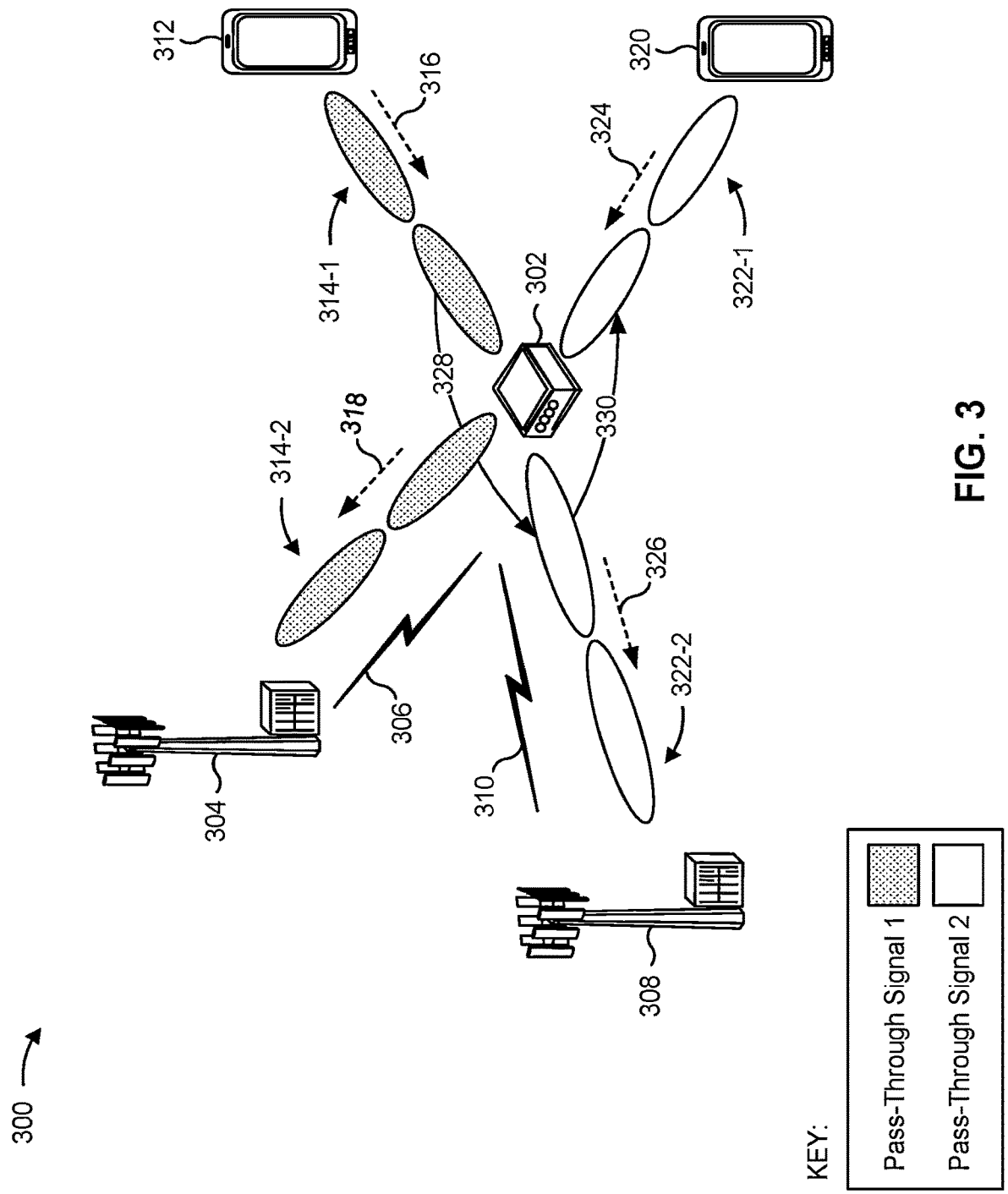
FIG. 3 is a diagram illustrating an example of a repeater device, in accordance with the present disclosure.

FIG. 3 is a diagram illustrating an example 300 of a repeater device, in accordance with the present disclosure.

In some aspects, a wireless communication system may use mmWaves to transmit information and/or data, such as a wireless communication system that is based at least in part on using the above-6 GHz frequencies associated with FR1 and/or FR2. While transmissions that use mmWaves (or higher) may enable a device to transmit or receive the information and/or data at a higher capacity (e.g., a higher data rate or increased data throughput) relative to lower frequencies, the higher frequencies and/or beam transmissions may be more susceptible to adverse channel conditions and/or blockages. As one example, a mmWave may observe increased recovery errors (relative to lower frequencies) based at least in part on a multipath associated with reflections. Some wireless communication systems may use beamforming at higher frequencies to improve a signal quality (e.g., increased power level), increase range and reliability, and/or reduce interference. To illustrate, a transmitter device may use multiple antennas to generate transmissions that constructively and/or destructively interfere with one another to generate a beamformed transmission that propagates in a desired direction and/or has increased signal strength in the desired direction. That is, beamforming may focus radio waves in a select direction and steer the antenna beams toward an intended receiver.

Beamforming and/or mmWaves may provide increased data throughput relative to lower frequencies when a transmitter operates in a line-of-sight (LoS) condition with a receiver, but may be more susceptible to disruption by an obstruction and/or blockage that obscures the LoS condition between the devices, such as a hand placed over an antenna, a building, or foliage, which may also result in increased recovery error at a receiver. Some operating environments, such as an indoor operating environment and/or an urban area, may include more obstructions that disrupt an LoS between a transmitter and a receiver. Accordingly, some wireless links may include an intermediary device to mitigate the obstructions, such as a repeater device that amplifies and/or redirects pass-through signals. "Pass-through signal" may denote a signal that is received by a repeater device, amplified by the repeater device, and/or redirected by the repeater device without alterations to content and/or information carried by the pass-through signal. That is, the information and/or content carried by the pass-through signal may be directed to a different recipient than the repeater device, and the repeater device may modify transmission properties of the pass-through signal to improve reception of the pass-through signal by the intended recipient (e.g., by amplifying the signal and/or changing a propagation direction to an LoS propagation direction between the repeater device and a receiver). The use of a repeater device may be associated with one or more operating conditions, such as a latency condition (e.g., to mitigate inter-symbol interference that is associated with a channel delay spread that is greater than a cyclic prefix length), a coverage area condition, and/or a simultaneous support condition (e.g., a number of UEs supported by the repeater device at one time).

The example 300 includes a repeater device 302 that may, in some cases, be implemented as a UE 120. To illustrate, the repeater device 302 may be in communication with a first network node 304 based at least in part on a first communication link 306 (e.g., a wired communication link and/or a wireless communication link). Alternatively, or additionally, the repeater device 302 may be in communication with a second network node 308 based at least in part on a second communication link 310. The first network node 304 and/or the second network node 308 may each use a respective communication link to indicate configuration information to the repeater device, such as a gain configuration and/or a beam configuration.

In some aspects, the repeater device 302 may support modifying transmission parameters (e.g., a power level and/or propagation direction) for multiple pass-through signals at a time. For instance, the example 300 includes a first UE 312 that may transmit a first beam 314-1 (shown with a dotted pattern) in a first propagation direction 316. The first beam 314-1 may be associated with a first pass-through signal of the repeater device 302 and/or may have a first power level. The repeater device 302 may generate a first repeated beam 314-2 (shown with a dotted pattern) that travels in a second propagation direction 318 based at least in part on amplifying and/or redirecting the first beam 314-1. That is, the repeater device 302 may redirect the first beam 314-1 by configuring the first repeated beam 314-2 to propagate in the second propagation direction 318 and/or with a second power level. In generating the first repeated beam 314-2, the repeater device 302 may refrain from modifying content and/or information in the first pass-through signal and/or carried by the first beam 314-1 such that the first repeated beam 314-2 repeats the same content and/or information as the first beam 314-1.

The example 300 also includes a second UE 320 that may transmit a second beam 322-1 (shown in solid white) that travels in a third propagation direction 324 and/or has a third power level. The second beam 322-1 may be associated with a second pass-through signal at the repeater device 302 and the repeater device 302 may generate a second repeated beam 322-2 (shown in solid white) that travels in a fourth propagation direction 326 toward the second network node 308. That is, the repeater device 302 may redirect the second beam 322-1 by configuring the second repeated beam 322-2 to propagate in the fourth propagation direction 326 and/or with a fourth power level, and the second repeated beam 322-2 may repeat content and/or information in the second pass-through signal and/or carried by the second beam 322-1 (e.g., without modification by the repeater device 302).

Too much power amplification applied by a repeater device to one or more repeated signals may result in oscillation and/or feedback that forms a positive loop between an output of a device and an input of the device. Oscillation may occur at a repeater device when at least a portion of a first repeated signal that is transmitted by the repeater device leaks into a second signal received by the repeater device and passed through the repeater device again. To illustrate, leakage 328 may represent signal leakage associated with the first beam 314-1 that leaks into the first repeated beam 314-2 and/or the second repeated beam 322-2. For instance, the leakage 328 may occur based at least in part on an amount of signal isolation provided by a hardware configuration of the different transmission and/or receiver hardware paths of the repeater device 302. Alternatively, or additionally, the leakage 328 may occur based at least in part on the first beam 314-1, the first repeated beam 314-2, and/or the second repeated beam 322-2 occupying a same portion of spectrum (e.g., a same carrier frequency and/or a same frequency band). Accordingly, the first repeated beam 314-2 and/or the second repeated beam 322-2 may include leakage associated with the first beam 314-1.

To further explain, the first repeated beam 314-2 may be denoted as SI, the leakage of the first beam 314-1 into the first repeated beam 314-1 and second repeated beam 322-1 may be denoted as $L_{12}$, and a configured gain of the repeater device 302 for the repeater pair of the first beam 314-1 and the first repeated beam 314-2 may be denoted as $G_1$. Accordingly, the (additional) signal leakage included in the second repeated beam 322-2 may be denoted as $$L_{12} * G_1 * S_1 \tag{1}$$

The reverse may also occur, where leakage 330 that is associated with the second beam 322-1 may leak into the second repeated beam 322-2 and/or the first repeated beam 314-2, which may be denoted as $L_{21}$. Alternatively, or additionally, a configured gain at the repeater device 302 for the repeater pair of the second beam 322-1 and the second repeated beam 322-2 may be denoted as $G_2$, and the first repeated beam 314-2 may include additional signal leakage which may be denoted as:

$$L_{12} * L_{21} * G_1 * G_2 * S_1 \tag{2}$$

Provided that the additional signal characterized by equation (2) satisfies an oscillation threshold, oscillation will not occur. That is, low values of $G_1$ and/or $G_2$ (e.g., values that satisfy the oscillation threshold) may mitigate oscillation, and high values of $G_1$ and/or $G_2$ (e.g., values fail to satisfy the oscillation threshold) may result in oscillation.

Different beam pairs, different frequencies, and/or different repeater devices may have different gain bounds and/or oscillation thresholds for mitigating oscillation. Some non-limiting examples of beam pairs may include a repeater beam pair that includes a transmit beam and a receive beam that are associated with repeating a beam (e.g., the first beam 314-1 and the first repeated beam 314-2) and/or a repeater cross-beam pair that may include two repeated beams (e.g., the first repeated beam 314-2 and the second repeated beam 322-2) and/or an originating beam with a non-related repeated beam (e.g., the first beam 314-1 and the second repeated beam 322-2). To illustrate different beam pairs having different oscillation thresholds, high frequency beams, such as beams associated with mmWave frequencies or higher, may have a spatially narrower beamwidth relative to low frequency beams (e.g., sub-6 GHz frequencies). Accordingly, high frequency beam pairs may be associated with different amounts of signal leakage relative to low frequency beam pairs and, subsequently, may have different oscillation thresholds and/or different gain bounds for mitigating oscillation. As yet another example, different repeater devices may utilize different hardware configurations that provide different levels of signal isolation. Without knowledge of a hardware configuration of a repeater device and/or the varying oscillation thresholds associated with different beam configurations, a network node may instruct a repeater device to apply a gain configuration that results in oscillation at the repeater device. The oscillation may result in reduced signal quality (e.g., increased signal leakage and/or increased oscillation), increased recovery errors at a receiver, reduced data throughput, and/or increased data transfer latencies. Alternatively, or additionally, the oscillation may result in fewer pass-through signals at the repeater device (e.g., to reduce a number of beams at the repeater device) and, subsequently, fewer wireless links that may benefit from the repeater device.

Some techniques and apparatuses described herein provide repeater leakage reports. In some aspects, a repeater device may transmit a repeater leakage report that indicates one or more signal leakage metrics associated with the repeater device, such as a signal leakage amount and/or a maximum gain. To illustrate, the signal leakage amount may specify a power level of observed signal leakage, and a maximum gain may refer to a power amplification bound at the repeater device (e.g., a power amplifier bound based on hardware and/or a gain bound associated with oscillation). Each signal leakage metric may be associated with a respective beam pair (e.g., a transmit beam and a receive beam and/or a cross-beam pair) that is associated with repeating a signal. The repeater device may receive an indication of gain configuration information, and the gain configuration information may specify a respective gain configuration for each respective pass-through signal of one or more pass-through signals associated with the repeater device.

In some aspects, a network node may receive a repeater leakage report that indicates one or more signal leakage metrics associated with a repeater device. Based at least in part on receiving the repeater leakage report, the network node may transmit an indication of gain configuration information that is based at least in part on the repeater leakage report. For example, the network node may select a first gain configuration for a first beam pair associated with a first pass-through signal at the repeater device and/or a second gain configuration for a second beam pair associated with a second pass-through signal at the repeater device based at least in part on the repeater leakage report. Alternatively, or additionally, the network node may configure the first beam pair and/or the second beam pair by selecting one or more beams to include in the respective beam pair based at least in part on the repeater leakage report, such as by selecting beams associated with less signal leakage relative to other beams. The network node may indicate the first gain configuration and/or the second gain configuration in the gain configuration information.

By transmitting a repeater leakage report, a repeater device may indicate, to a network node, a respective signal leakage associated with a respective beam pair. The network node may then select a gain configuration and/or a beam pair that mitigates oscillation at the repeater device and improves a signal quality (e.g., decreased signal leakage and/or decreased oscillation). The increased signal quality may result in decreased recovery errors at a receiver, increased data throughput, and/or decreased data transfer latencies. Alternatively, or additionally, mitigating the oscillation may increase a number of pass-through signals supported by the repeater device.

As indicated above, FIG. 3 is provided as an example. Other examples may differ from what is described with regard to FIG. 3.

Figure 4:
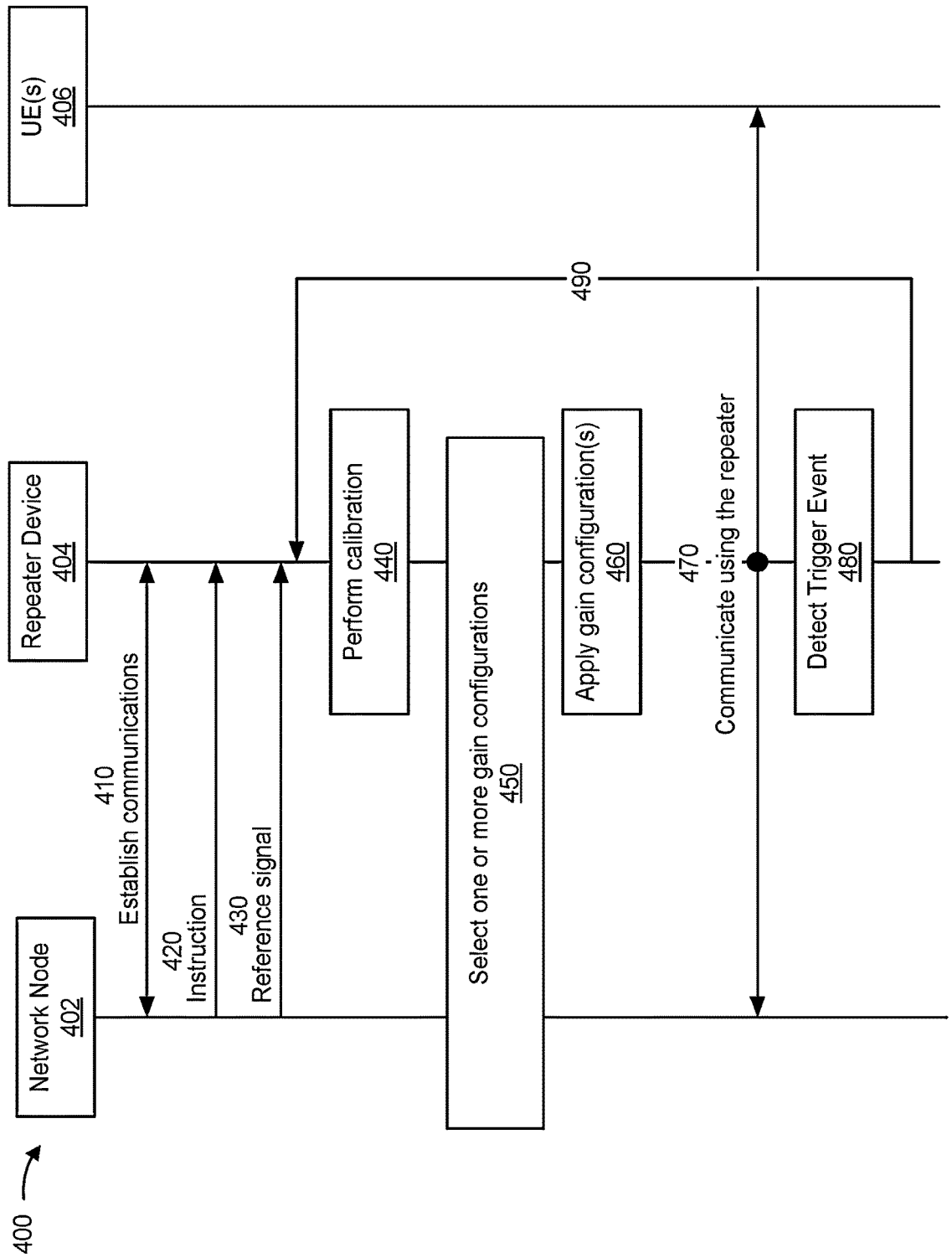
FIG. 4 is a diagram illustrating an example of a wireless communication process between a network node, a repeater device, and one or more UEs, in accordance with the present disclosure.

FIG. 4 is a diagram illustrating an example 400 of a wireless communication process between a network node 402 (e.g., a network node 110), a repeater device 404 (e.g., a UE 120), and one or more UEs 406 (e.g., one or more other UEs 120), in accordance with the present disclosure.

As shown by reference number 410, a network node 402 and a repeater device 404 may establish communications with one another. As one example, the repeater device 404 may be a UE 120 that includes capabilities to wirelessly connect with the network node 402. Accordingly, the network node 402 and the repeater device 404 may establish one or more wireless links. Alternatively, or additionally, the repeater device 404 may communicate with the network node 402 based at least in part on a wired link to a network (e.g., the Internet).

As shown by reference number 420, the network node 402 may transmit, and the repeater device 404 may receive, one or more instructions, such as an instruction that is associated with configuring the repeater device 404, an instruction to return information, and/or an instruction to perform a procedure. The network node 402 may transmit an instruction in any combination of a radio resource control (RRC) message, a medium access control (MAC) control element (CE), and/or downlink control information (DCI).

In some aspects, the network node 402 may indicate an instruction to perform a calibration procedure, such as a self-calibration procedure that the repeater device 404 performs autonomously, and/or an assisted calibration procedure that is based at least in part on a reference signal transmitted by another device. A calibration procedure may enable a device (e.g., the repeater device 404) to calculate an error and/or accuracy of a hardware configuration, such as by calculating a difference between expected characteristics of a signal and observed characteristics of the signal. Alternatively, or additionally, the calibration procedure may enable the device to calculate signal metrics and/or error metrics, such as a signal leakage metric that indicates an amount of signal leakage associated with a transmit beam that is observed in a receive beam (or vice versa). In some aspects, the calibration routing may iterate through multiple combinations of beams and/or generate respective signal leakage metrics for each respective combination. The differences and/or signal metrics calculated based at least in part on the calibration procedure may be used by the device to adjust, correct, and/or tune hardware to mitigate real-world effects that cause hardware to deviate from ideal operation. Alternatively, or additionally, the differences and/or signal metrics may be used by the network node 402 and/or the repeater device 404 to select a repeater device configuration (e.g., beam selection and/or gain configuration) that balances signal quality with mitigating oscillation.

As part of a self-calibration procedure, the repeater device 404 may use a local source to calculate an error metric, a signal metric, and/or a hardware adjustment (e.g., self-calibration information). As part of an assisted calibration procedure, the repeater device 404 may use a reference signal transmitted by another device to calculate the error metric, the signal metric, and/or the hardware adjustment (e.g., assisted calibration information). Examples of reference signals transmitted by another device may include the network node 402 transmitting a downlink reference signal, such as a channel state information reference signal (CSI-RS), and/or a UE (e.g., one of the UEs 406) transmitting an uplink reference signal, such as a sounding reference signal (SRS). Accordingly, the repeater device 404 may perform an assisted calibration procedure based at least in part on one or more reference signals to generate assisted calibration information. In some aspects, the network node 402 may indicate a reference signal configuration (e.g., as part of the instruction to perform an assisted calibration procedure). Some non-limiting examples of reference signal configuration information may include a frequency location of a reference signal, a time location of the reference signal, and/or a beam configuration (e.g., a beam direction and/or a spatial beam width) of a beam that carries the reference signal. Alternatively, or additionally, the network node 402 may indicate calibration configuration information, such as one or more beam pairs to include in the calibration procedure (e.g., for generating an error metric and/or a signal metric). The network node 402 may also indicate, as the calibration configuration information, a periodicity for performing the calibration procedure and/or a trigger event for performing the calibration procedure, such as a first trigger event associated with a temperature change and/or a second trigger event associated with a communication channel metric.

In some aspects, the network node 402 may indicate an instruction and/or request to return a repeater leakage report. The instruction may include leakage report configuration information, such as one or more beam pairs and/or one or more associated signal metrics to include in the repeater leakage report. That is, the network node 402 may indicate to return a signal leakage metric for one or more particular beam pairs. The ability to request a signal leakage metric for a particular beam pair enables the network node 402 to evaluate a signal quality associated with the particular beam pair (e.g., for communicating with one of the UEs 406) and, subsequently, determine whether the particular beam pair provides adequate signal quality (e.g., the signal quality satisfies a quality threshold).

As shown by reference number 430, the network node 402 may transmit, and the repeater device 404 may receive, a reference signal as part of an assisted calibration procedure, such as a downlink reference signal (e.g., a CSI-RS). Alternatively, or additionally, the repeater device 404 may generate one or more signal metrics (e.g., a Layer 1 signal metric) based at least in part on the reference signal. In some aspects, the repeater device 404 may indicate the Layer 1 signal metric to the network node 402 (e.g., via RRC signaling and/or a MAC CE), such as in a repeater leakage report or another mechanism. While FIG. 4 illustrates the network node 402 in the example 400, other examples may include one or more of the UEs 406 transmitting a reference signal as part of an assisted calibration procedure, such as an uplink reference signal (e.g., an SRS). For example, the network node 402 may instruct one of the UEs 406 to transmit the uplink reference signal based at least in part on a reference signal configuration and/or may indicate the reference signal configuration to the repeater device 404. However, and as described above, the network node 402 and/or the UEs 406 may refrain from transmitting a reference signal as part of a calibration procedure, such as in a scenario associated with the repeater device 404 performing a self-calibration procedure.

In some aspects, the reference signal may be directed to repeater device 404 (e.g., the repeater device 404 is an intended end point and/or recipient of the reference signal). In other aspects, the reference signal may be a pass-through signal at the repeater device 404. Accordingly, the repeater device 404 may receive the reference signal based at least in part on a receive beam and/or repeat the reference signal based at least in part on a transmit beam. As one example, the receive beam and the transmit beam associated with the reference signal may be specified by the network node 402 as part of the calibration configuration information and/or as part of the reference signal configuration information.

Alternatively, or additionally, the network node 402 may instruct the repeater device 404 to use one or more beam pairs for one or more pass-through signals. For example, the network node 402 may configure the repeater device 404 to use a first beam pair to receive and repeat a first downlink signal, a second beam pair to receive and repeat a second downlink signal, a third beam pair to receive and repeat a first uplink signal, and/or a fourth beam pair to receive and repeat a second uplink signal in a similar manner as described with regard to FIG. 3.

As shown by reference number 440, the repeater device 404 may perform a calibration procedure, such as a self-calibration procedure and/or an assisted calibration procedure. While the example 400 includes the repeater device 404 performing a calibration procedure, the repeater device 404 may refrain from performing a calibration procedure in other examples. For example, the repeater device 404 may store calibration information in memory, such as factory calibration information generated and/or stored during assembly of the repeater device 404. Alternatively, or additionally, the repeater device 404 may perform the calibration procedure periodically to generate updated calibration information (e.g., updated self-calibration information and/or updated assisted calibration information). To illustrate, the repeater device 404 may perform the calibration procedure based at least in part on a periodicity specified in the calibration configuration information. In some aspects, the repeater device 404 may iteratively perform the calibration procedure based at least in part on detecting a trigger event, such as detecting a communication channel condition (e.g., a change in the communication channel condition that satisfies a signal metric trigger threshold) and/or an operating condition associated with the repeater device (e.g., a change in an operating temperature at the repeater device 404 that satisfies a temperature trigger threshold). In performing the calibration procedure, the repeater device 404 may generate a signal metric and/or an error metric. For instance, the repeater device 404 may generate a signal leakage metric that indicates an amount of signal leakage between one or more beam pairs as described with regard to FIG. 3. Alternatively, or additionally, the repeater device 404 may generate one or more signal metrics, such as a Layer 1 signal metric (e.g., Layer 1 RSRP) based at least in part on a reference signal as described above.

As shown by reference number 450, the network node 402 and/or the repeater device 404 may select one or more gain configurations, as further described with regard to FIGS. 5A and 5B. As part of selecting the one or more gain configurations, the network node 402 and/or the repeater device 404 may communicate with one another.

As one example, and as described with regard to FIG. 5A, the repeater device 404 may transmit, and the network node 402 may receive, a repeater leakage report. In some aspects, the repeater leakage report may indicate one or more signal leakage metrics associated with a repeater device 404. Alternatively, or additionally, each signal leakage metric may be associated with a respective beam pair (e.g., a respective transmit beam and a respective receive beam associated with a pass-through signal and/or a respective cross-beam pair), and the repeater leakage report may indicate the respective beam pair associated with the respective signal leakage metric. The signal leakage metric may indicate an amount of signal leakage associated with a beam pair and/or may indicate a maximum gain associated with the beam pair (e.g., a maximum gain associated with a power amplifier bound or a maximum gain before oscillation occurs). Accordingly, the repeater leakage report may specify any combination of an amount of signal leakage associated with a beam pair, a maximum gain associated with the beam pair, and/or a beam pair identifier (e.g., a repeater beam pair identifier and/or a repeater cross-beam pair identifier). As one example, using a gain larger than the maximum gain may result in oscillation. Accordingly, oscillation may be mitigated by applying a gain no larger than the maximum gain. As another example, the repeater device may be configured to repeat a signal based at least in part on using a first beam pair that is associated with less signal leakage relative to a second beam pair.

The network node 402 may select the gain configuration(s) based at least in part on the repeater leakage report, such as explicit gain configuration information that specifies a gain to apply to one or more pass-through signals at the repeater device 404. Alternatively, or additionally, the gain configuration information may specify a beam pair associated with the gain. Accordingly, the network node 402 may transmit an indication of the explicit gain configuration information to the repeater device 404.

As another example, and as described with regard to FIG. 5B, the repeater device 404 may transmit the repeater leakage report (e.g., to the network node 402), and the network node 402 may select a beam pair to use for communicating with at least one of the UEs 406 (e.g., for a pass-through signal at the repeater device 404) based at least in part on the repeater leakage report. Alternatively, or additionally, the network node 402 may transmit, and the repeater device 404 may receive, inferred gain configuration information, such as one or more gain parameters that provide guidance for selecting a gain configuration. To illustrate, the gain parameters may include, by way of example and not of limitation, traffic priority information and/or target signal-to-noise ratio (SNR) information. Based at least in part on receiving the inferred gain configuration information (e.g., a gain parameter), the repeater device 404 may select the gain configuration(s) as described below.

As shown by reference number 460, the repeater device 404 may apply one or more gain configuration(s). That is, the repeater device 404 may adjust one or more hardware settings that result in the repeater device 404 applying a respective gain to a respective pass-through signal. For example, in applying the gain configuration(s), the repeater device 404 may adjust a first gain associated with a first pass-through signal and a first beam pair and/or a second gain associated with a second pass-through signal and a second beam pair. Accordingly, the repeater device 404 may adjust a hardware configuration that results in the repeater device 404 applying the respective gain configuration for each respective pass-through signal and repeating pass-through signal(s) based at least in part on the respective gain configuration.

As shown by reference number 470, the network node 402 may communicate with the UE(s) 406 based at least in part on using the repeater device 404. As one example, the network node 402 may transmit a downlink signal to a first UE of the UE(s) 406 based at least in part on the repeater device 404 receiving the downlink signal as a pass-through signal, and the repeater device 404 repeating and/or relaying the downlink signal to the first UE. Alternatively, or additionally, a second UE of the UE(s) 406 may transmit an uplink signal to the network node 402 based at least in part on the repeater device 404 receiving the uplink signal as a pass-through signal, and the repeater device 404 repeating and/or relaying the uplink signal to the network node 402.

As shown by reference number 480, the repeater device 404 may detect a reporting trigger event that is associated with reporting a repeater leakage report (e.g., to the network node 402). Based at least in part on detecting the reporting trigger event, and as shown by reference number 490, the repeater device 404 may perform a calibration procedure as described with regard to reference number 440 and/or may transmit a repeater leakage report to the network node 402 as described with regard to reference number 450, FIG. 5A, and/or FIG. 5B. To illustrate, the repeater device 404 may detect, as the reporting trigger event, a change in a communication channel condition and/or a change in an operating condition at the repeater device.

In some aspects, the repeater device 404 may autonomously perform a calibration procedure (e.g., a self-calibration procedure) and/or autonomously transmit an updated repeater leakage report (e.g., that is based at least in part on the self-calibration procedure, the change in the communication channel condition, and/or the change in operating condition). To illustrate, the repeater device 404 may select, from factory calibration information, previously generated self-calibration information, and/or previously generated assisted calibration information, a new signal leakage metric (e.g., an amount of signal leakage and/or a maximum gain) for a beam pair based at least in part on the change in the communication channel condition and/or the change in operating condition. Alternatively, or additionally, the repeater device 404 may perform a calibration procedure that generates one or more updated signal leakage metrics. The repeater device 404 may select a new signal leakage metric for the beam pair from the updated signal leakage metrics. While the example 400 shown by FIG. 4 includes the repeater device 404 detecting the reporting trigger event, other examples may include the repeater device 404 periodically performing a calibration procedure and/or periodically transmitting an updated repeater leakage report without detecting a reporting trigger event.

In some aspects, the network node 402 and/or the repeater device 404 may iteratively select one or more updated gain configurations in a manner as described with regard to reference number 450, FIG. 5A, and/or FIG. 5B. Alternatively, or additionally, the repeater device 404 may iteratively apply the updated gain configuration(s) as described with regard to reference number 460, and the network node 402 and the UE(s) 406 may communicate with one another based at least in part on using the repeater device 404 as described with regard to reference number 470.

By transmitting a repeater leakage report, a repeater device may indicate, to a network node, a respective signal leakage associated with a respective beam pair. The network node may then select a gain configuration and/or a beam pair that mitigates oscillation at the repeater device and improves a signal quality (e.g., decreased signal leakage and/or decreased oscillation). The increased signal quality may result in decreased recovery errors at a receiver, increased data throughput, and/or decreased data transfer latencies. Alternatively, or additionally, mitigating the oscillation may increase a number of pass-through signals supported by the repeater device.

As indicated above, FIG. 4 is provided as an example. Other examples may differ from what is described with regard to FIG. 4.

FIGS. 5A and 5B are diagrams illustrating a first example 500 and a second example 502, respectively, of a wireless communication process between the network node 402 and the repeater device 404 as described with regard to FIG. 4, in accordance with the present disclosure. In some aspects, the wireless communication process described by the first example 500 and/or the second example 502 may be included as at least part of one or more actions that are described with regard to reference number 430 of FIG. 4.

FIG. 5A illustrates the first example 500. As shown by reference number 510, the repeater device 404 may transmit, and the network node 402 may receive, a repeater leakage report. As described above, the repeater leakage report may indicate one or more signal leakage metrics that are associated with the repeater device 404. Alternatively, or additionally, each signal leakage metric may be associated with a respective beam pair (e.g., a respective transmit beam and a respective receive beam associated with a pass-through signal and/or a respective cross-beam pair). In some aspects, the repeater leakage report may indicate the respective beam pair associated with the respective signal leakage metric. To illustrate, the repeater leakage report may indicate a first signal leakage metric associated with a beam pair that specifies an amount of signal leakage associated with the beam pair and/or a second signal leakage metric that specifies a maximum gain associated with the beam pair (e.g., a maximum gain for mitigating oscillation using the beam pair). That is, a gain larger than the maximum gain may result in oscillation. Accordingly, oscillation may be mitigated by applying a gain no larger than the maximum gain.

The repeater device 404 may selectively include signal leakage metrics and/or beam pairs to the repeater leakage report. For example, the repeater device 404 may generate M signal leakage metrics and selectively include each signal leakage metric (e.g., of the M signal leakage metrics) that satisfies a leakage threshold, where M is a first integer. The leakage threshold may be based at least in part on identifying strong signal leakage between beams (e.g., and beam pairs to avoid) or weak signal leakage between beams (e.g., and beam pairs to use). As another example, the repeater device 404 may select N signal leakage metrics out of the M signal leakage metrics that are associated with the N top values (e.g., the most signal leakage and/or the least signal leakage), where N is a second integer. As one example, the repeater device 404 may rank the M signal leakage metrics by positioning stronger signal leakage metrics at a top of the rank and select the N strongest signal leakage metrics to include in the signal leakage report. As another example, the repeater device 404 may rank the M signal leakage metrics by positioning weaker signal leakage metrics at a top of the rank and select the N weakest signal leakage metrics to include in the signal leakage report. Indicating the strongest signal leakage metrics may enable the network node 402 to avoid selecting beam pairs that have more signal leakage relative to other beam pairs. Indicating the weakest signal leakage metrics may enable the network node 402 to select beam pairs that have more isolation from one another (e.g., and less signal leakage) to improve a signal quality. Accordingly, the signal leakage report may implicitly indicate that a signal leakage metric satisfies the leakage threshold and/or is within the N-th top-ranked signal leakage metrics based at least in part on including the signal leakage metric within the signal leakage report. Including a subset of signal leakage metrics (e.g., N signal leakage metrics or only signal leakage metrics that satisfy a threshold) may reduce an amount of air interface resources used to transmit the repeater leakage report, such that the preserved air interface resources may be used for other purposes.

As shown by reference number 520, the network node 402 may select one or more gain configurations based at least in part on the repeater leakage report. To illustrate, the network node 402 may select a first gain configuration (e.g., a gain amount) for a first beam pair associated with a first pass-through signal at the repeater device 404, and/or a second gain configuration for a second beam pair associated with a second pass-through signal based at least in part on using the repeater leakage report. For instance, the network node 402 may select the first gain configuration based at least in part on a first maximum gain indicated by the repeater leakage report and/or the second gain configuration based at least in part on a second maximum gain indicated by the repeater leakage report to mitigate oscillation.

Alternatively, or additionally, the network node 402 may select the first gain configuration and/or the second gain configuration based at least in part on the first pass-through signal and/or the second pass-through signal satisfying a signal quality threshold. To illustrate, the network node 402 may select the first gain configuration based at least in part on a first target SNR for the first pass-through signal and/or the first pass-through signal satisfying a first SNR threshold. The network node 402 may also select the second gain configuration based at least in part on a second target SNR for the second pass-through signal and/or the second pass-through signal satisfying a second SNR threshold. In some aspects, the network node 402 may select the first gain configuration and/or a second gain configuration based at least in part on a Layer 1 signal metric, such as a Layer 1 RSRP metric (e.g., received from the repeater device 404). For instance, the network node 402 may select an increase in gain or a reduction in gain based at least in part on the Layer 1 signal metric.

In some aspects, the network node 402 may select the first gain configuration and/or the second gain configuration based at least in part on a priority (e.g., a data traffic priority) associated with the first pass-through signal and/or the second pass-through signal. To illustrate, the first pass-through signal may be associated with a lower data traffic priority relative to the second pass-through signal, and the network node 402 may prioritize meeting a signal quality metric associated with the second pass-through signal by selecting a higher gain for the second gain configuration relative to the first gain configuration. Accordingly, the network node 402 may select the first gain configuration and the second gain configuration based at least in part on any combination of a priority, a Layer 1 signal metric, a target SNR, a signal leakage metric, and/or a maximum gain to optimize a link budget. While described as selecting two gain configurations, other examples may include the network node 402 selecting more or fewer gain configurations. As shown by reference number 530, the network node 402 may transmit, and the repeater device 404 may receive, an indication of gain configuration information that is associated with a respective gain configuration for one or more pass-through signals at the repeater device 404. In some aspects, the gain configuration information may specify explicit gain information, such as a gain amount to apply for a particular beam pair and/or for a particular pass-through signal. In other aspects, and as described with regard to the second example 502, the gain configuration information may specify inferred gain information, such as one or more gain parameters that may be used to compute a gain amount.

FIG. 5B illustrates the second example 502. As shown by reference number 540, the repeater device 404 may transmit, and the network node 402 may receive, a repeater leakage report. As described above, the repeater leakage report may indicate one or more signal leakage metrics that are associated with a respective beam pair (e.g., a respective transmit beam and a respective receive beam associated with a pass-through signal and/or a respective cross-beam pair). Alternatively, or additionally, the repeater leakage report may indicate the respective beam pair associated with the respective signal leakage metric. The repeater device 404 may selectively include signal leakage metrics and/or beam pairs in the repeater leakage report, such as only including signal leakage metric(s) that satisfy a leakage threshold and/or only including the N highest values out of M signal leakage metrics, where N<M. Transmitting the repeater leakage report to the network node 402 may enable the network node 402 to select beam pairs and/or cross-beam pairs for pass-through signals that mitigate oscillation and/or improve signal quality.

As shown by reference number 550, the network node 402 may transmit, and the network node 402 may receive, an indication of gain configuration information. In some aspects, the gain configuration information may specify inferred gain configuration information, such as one or more target SNR gain parameters and/or one or more priority gain parameters. Accordingly, the gain configuration information may indicate one or more gain parameters that are associated with calculating a respective gain configuration for one or more pass-through signals and/or beam pairs associated with the repeater device.

As shown by reference number 560, the repeater device 404 may select one or more gain configurations, such as a first gain configuration for a first beam pair associated with a first pass-through signal and/or a second gain configuration for a second beam pair associated with a second pass-through signal. In some aspects, the repeater device 404 may select the gain configurations based at least in part on information included in a repeater leakage report, such as by selecting the first gain configuration based at least in part on a first maximum gain indicated by the repeater leakage report and/or the second gain configuration based at least in part on a second maximum gain indicated by the repeater leakage report. Alternatively, or additionally, the repeater device 404 may select the first gain configuration and/or the second gain configuration based at least in part on the first pass-through signal satisfying a first signal quality threshold and/or the second pass-through signal satisfying a second signal quality threshold (e.g., a target SNR threshold). In some aspects, the repeater device 404 may select the first gain configuration and/or a second gain configuration based at least in part on a Layer 1 signal metric, such as a Layer 1 RSRP metric (e.g., generated by the repeater device 404) that is associated with a pass-through signal. For instance, the repeater device 404 may select an increase in gain or a reduction in gain based at least in part on the Layer 1 signal metric and a target power level. Alternatively, or additionally, the repeater device 404 may select the first gain configuration and/or the second gain configuration based at least in part on a priority, in a similar manner as described with regard to reference number 520. Accordingly, the repeater device 404 may select the first gain configuration and the second gain configuration based at least in part on any combination of a priority, a Layer 1 signal metric, a target SNR, a signal leakage metric, and/or a maximum gain to optimize a link budget. While described as selecting two gain configurations, other examples may include the repeater device 404 selecting more or fewer gain configurations.

By transmitting a repeater leakage report, a repeater device may indicate, to a network node, a respective signal leakage associated with a respective beam pair. The network node may then select a gain configuration and/or a beam pair that mitigates oscillation at the repeater device and improves a signal quality (e.g., decreased signal leakage and/or decreased oscillation). The increased signal quality may result in decreased recovery errors at a receiver, increased data throughput, and/or decreased data transfer latencies. Alternatively, or additionally, mitigating the oscillation may increase a number of pass-through signals supported by the repeater device.

As indicated above, FIGS. 5A and 5B are provided as examples. Other examples may differ from what is described with regard to FIGS. 5A and 5B.

Figure 6:
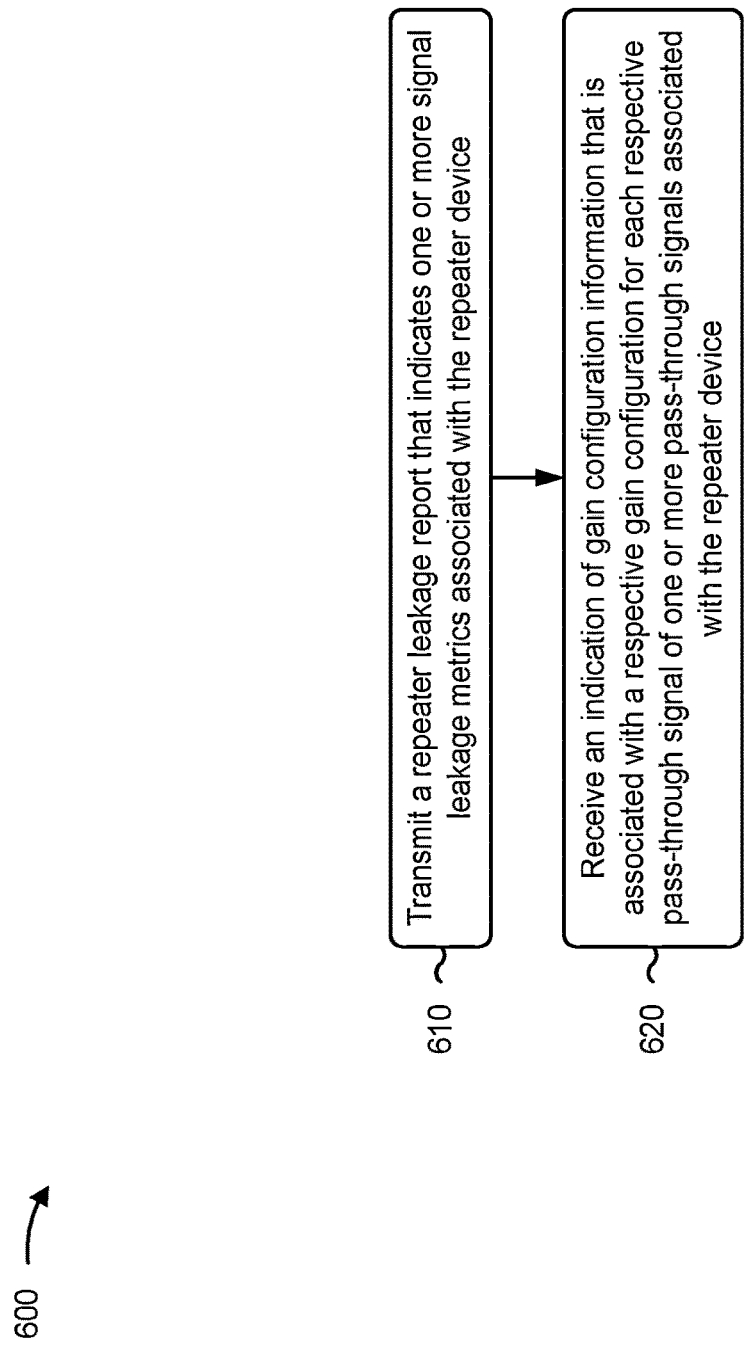
FIG. 6 is a diagram illustrating an example process performed, for example, by a repeater device, in accordance with the present disclosure.

FIG. 6 is a diagram illustrating an example process 600 performed, for example, by a repeater device, in accordance with the present disclosure. Example process 600 is an example where the repeater device (e.g., the repeater device 404 and/or a UE 120) performs operations associated with repeater leakage reports.

As shown in FIG. 6, in some aspects, process 600 may include transmitting a repeater leakage report that indicates one or more signal leakage metrics associated with the repeater device (block 610). For example, the repeater device (e.g., using transmission component 804 and/or communication manager 806, depicted in FIG. 8) may transmit a repeater leakage report that indicates one or more signal leakage metrics associated with the repeater device, as described above.

As further shown in FIG. 6, in some aspects, process 600 may include receiving an indication of gain configuration information that is associated with a respective gain configuration for each respective pass-through signal of one or more pass-through signals associated with the repeater device (block 620). For example, the repeater device (e.g., using reception component 802 and/or communication manager 806, depicted in FIG. 8) may receive an indication of gain configuration information that is associated with a respective gain configuration for each respective pass-through signal of one or more pass-through signals associated with the repeater device, as described above.

Process 600 may include additional aspects, such as any single aspect or any combination of aspects described below and/or in connection with one or more other processes described elsewhere herein.

In a first aspect, process 600 includes applying the respective gain configuration for each respective pass-through signal, and repeating the one or more pass-through signals based at least in part on the respective gain configuration for each respective pass-through signal.

In a second aspect, the repeater leakage report is based at least in part on at least one of factory calibration information, self-calibration information, or assisted calibration information.

In a third aspect, process 600 includes receiving an instruction to perform a self-calibration procedure that generates self-calibration information, and performing the self-calibration procedure.

In a fourth aspect, the instruction to perform the self-calibration procedure indicates to perform the self-calibration procedure periodically, and performing the self-calibration procedure includes performing the self-calibration procedure periodically to generate updated self-calibration information.

In a fifth aspect, process 600 includes receiving an instruction to perform an assisted calibration procedure that is associated with generating assisted calibration information, receiving a reference signal that is associated with the assisted calibration procedure, and generating, as part of the assisted calibration procedure, the assisted calibration information based at least in part on the reference signal.

In a sixth aspect, process 600 includes receiving reference signal configuration information that is associated with the reference signal, and generating the assisted calibration information is based at least in part on the reference signal configuration information.

In a seventh aspect, the reference signal includes at least one of a CSI-RS, or an SRS.

In an eighth aspect, each signal leakage metric of the one or more signal leakage metrics is associated with a respective beam pair that includes at least a respective transmit beam and a respective receive beam.

In a ninth aspect, process 600 includes selecting the one or more signal leakage metrics from M signal leakage metrics based at least in part on each signal leakage metric of the one or more signal leakage metrics satisfying a threshold, where M is an integer, and indicating, in the repeater leakage report, a respective beam pair for each signal leakage metric of the one or more signal leakage metrics.

In a tenth aspect, process 600 includes generating M signal leakage metrics, and selecting, as the one or more signal leakage metrics, N signal leakage metrics that are associated with the N top-ranked values out of the M signal leakage metrics, where M is a first integer and N is a second integer.

In an eleventh aspect, transmitting the repeater leakage report includes transmitting the repeater leakage report periodically.

In a twelfth aspect, process 600 includes detecting a reporting trigger event, and transmitting the repeater leakage report includes transmitting the repeater leakage report autonomously and based at least in part on detecting the reporting trigger event.

In a thirteenth aspect, the reporting trigger event is based at least in part on at least one of a communication channel condition, or an operating condition associated with the repeater device.

In a fourteenth aspect, the reporting trigger event is based at least in part on the operating condition, and the operating condition includes at least one of an operating temperature associated with the repeater device, or a change in the operating temperature associated with the repeater device.

In a fifteenth aspect, the indication of the gain configuration information is a first indication, and process 600 includes generating at least one Layer 1 signal metric based at least in part on a reference signal, and transmitting a second indication of the at least one Layer 1 signal metric.

In a sixteenth aspect, the at least one Layer 1 signal metric includes an RSRP metric.

In a seventeenth aspect, each signal leakage metric of the one or more signal leakage metrics is associated with a respective beam pair, and the repeater leakage report indicates a respective maximum gain for each respective beam pair.

In an eighteenth aspect, process 600 includes selecting, based at least in part on the repeater leakage report, a first gain configuration for a first beam pair associated with a first pass-through signal of the one or more pass-through signals, and a second gain configuration for a second beam pair associated with a second pass-through signal of the one or more pass-through signals, and selecting the first gain configuration and the second gain configuration is based at least in part on mitigating oscillation associated with the first beam pair and the second beam pair at the repeater device.

In a nineteenth aspect, selecting the first gain configuration and the second gain configuration is based at least in part on at least one of the first pass-through signal or the second pass-through signal satisfying a signal quality threshold.

In a twentieth aspect, selecting the first gain configuration and the second gain configuration is based at least in part on at least one Layer 1 signal metric.

In a twenty-first aspect, the at least one Layer 1 signal metric includes an RSRP metric.

In a twenty-second aspect, the gain configuration information indicates at least one of a first target SNR associated with the first pass-through signal, or a second target SNR associated with the second pass-through signal, and selecting the first gain configuration and the second gain configuration is based at least in part on at least one of the first target SNR or the second target SNR.

In a twenty-third aspect, selecting the first gain configuration and the second gain configuration is based at least in part on a first maximum gain associated with first beam pair, and selecting the second gain configuration is based at least in part on a second maximum gain associated with the second beam pair.

In a twenty-fourth aspect, the gain configuration information indicates a priority between at least the first pass-through signal and the second pass-through signal, and selecting the first gain configuration and the second gain configuration is based at least in part on the priority.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
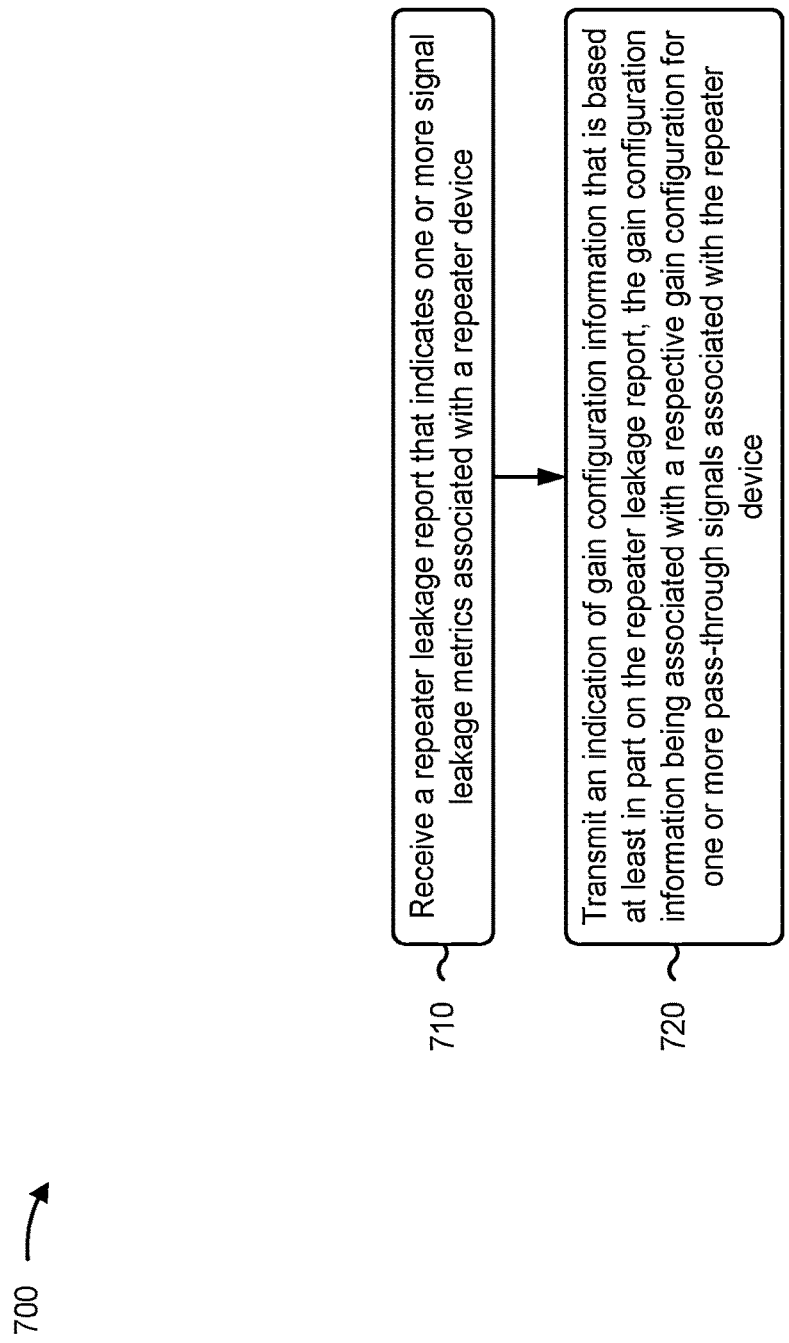
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110) performs operations associated with repeater leakage reports.

As shown in FIG. 7, in some aspects, process 700 may include receiving a repeater leakage report that indicates one or more signal leakage metrics associated with a repeater device (block 710). For example, the network node (e.g., using reception component 902 and/or communication manager 906, depicted in FIG. 9) may receive a repeater leakage report that indicates one or more signal leakage metrics associated with a repeater device, as described above.

As further shown in FIG. 7, in some aspects, process 700 may include transmitting an indication of gain configuration information that is based at least in part on the repeater leakage report, the gain configuration information being associated with a respective gain configuration for one or more pass-through signals associated with the repeater device (block 720). For example, the network node (e.g., using transmission component 904 and/or communication manager 906, depicted in FIG. 9) may transmit an indication of gain configuration information that is based at least in part on the repeater leakage report, the gain configuration information being associated with a respective gain configuration for one or more pass-through signals associated with the repeater device, as described above.

Process 700 may include additional aspects, such as any single aspect or any combination of aspects described below and/or in connection with one or more other processes described elsewhere herein.

In a first aspect, process 700 includes transmitting an instruction to perform a self-calibration procedure.

In a second aspect, the instruction to perform the self-calibration procedure indicates to perform the self-calibration procedure periodically.

In a third aspect, process 700 includes transmitting an instruction to perform an assisted calibration procedure based at least in part on a reference signal.

In a fourth aspect, process 700 includes transmitting the reference signal.

In a fifth aspect, process 700 includes transmitting reference signal configuration information that is associated with the reference signal.

In a sixth aspect, the reference signal includes at least one of a CSI-RS, or an SRS.

In a seventh aspect, each signal leakage metric of the one or more signal leakage metrics is associated with a respective beam pair that includes at least a respective transmit beam and a respective receive beam.

In an eighth aspect, each signal leakage metric of the one or more signal leakage metrics satisfies a threshold, and the repeater leakage report indicates a respective beam pair for each signal leakage metric of the one or more signal leakage metrics.

In a ninth aspect, receiving the repeater leakage report includes receiving the repeater leakage report aperiodically.

In a tenth aspect, process 700 includes selecting, based at least in part on the repeater leakage report and as at least part of the gain configuration information, a first gain configuration for a first beam pair associated with a first pass-through signal of the one or more pass-through signals, and a second gain configuration for a second beam pair associated with a second pass-through signal of the one or more pass-through signals, and selecting the first gain configuration and the second gain configuration is based at least in part on mitigating oscillation associated with the first beam pair and the second beam pair at the repeater device.

In an eleventh aspect, selecting the first gain configuration and the second gain configuration is based at least in part at least one of the first pass-through signal or the second pass-through signal satisfying a signal quality threshold.

In a twelfth aspect, the indication of the gain configuration information is a first indication, and process 700 includes receiving a second indication of at least one Layer 1 signal metric that is associated with the repeater device, and selecting the first gain configuration and the second gain configuration is based at least in part on the at least one Layer 1 signal metric.

In a thirteenth aspect, the at least one Layer 1 signal metric includes an RSRP metric.

In a fourteenth aspect, selecting the first gain configuration and the second gain configuration is based at least in part on at least one of a first target SNR associated with the first pass-through signal, or a second target SNR associated with the second pass-through signal.

In a fifteenth aspect, each signal leakage metric of the one or more signal leakage metrics is associated with a respective beam pair of one or more beam pairs, and the repeater leakage report indicates a respective maximum gain for the respective beam pair. In the fifteenth aspect, selecting the first gain configuration is based at least in part on a first maximum gain associated with first beam pair, and selecting the second gain configuration is based at least in part on a second maximum gain associated with the second beam pair.

In a sixteenth aspect, selecting the first gain configuration is based at least in part on a first maximum gain associated with first beam pair, and selecting the second gain configuration is based at least in part on a second maximum gain associated with the second beam pair.

In a seventeenth aspect, selecting the first gain configuration and the second gain configuration is based at least in part on a priority between at least the first pass-through signal and the second pass-through signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
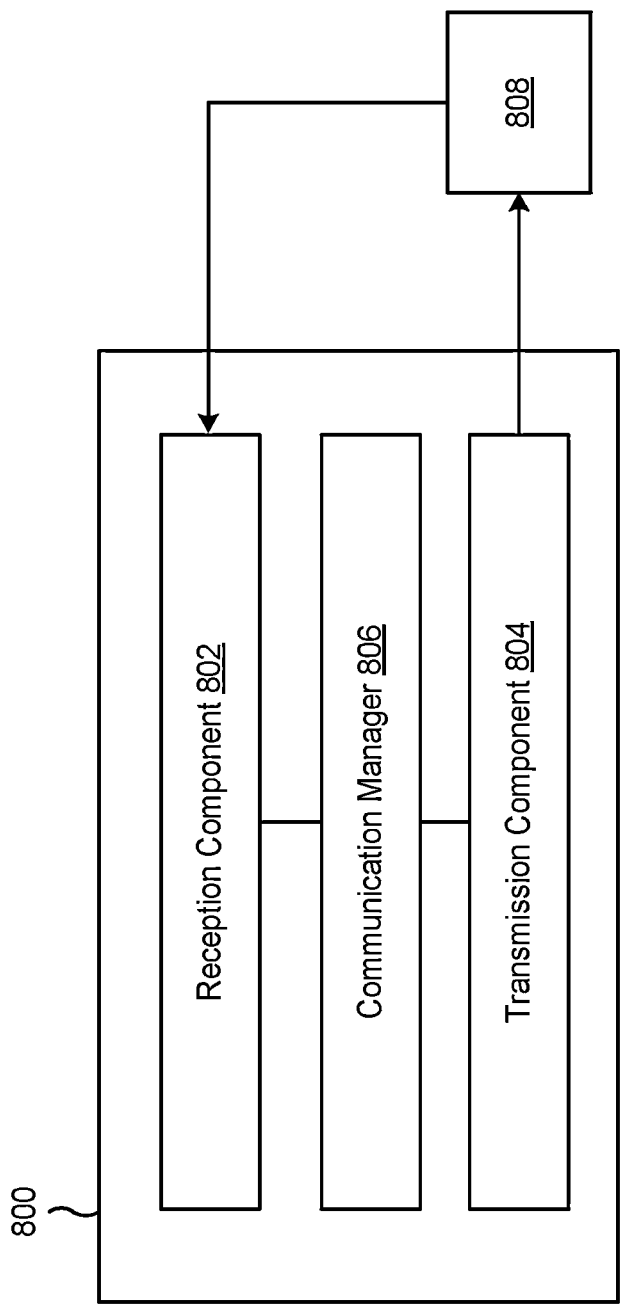
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a repeater device, or a repeater device may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 3-7. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the repeater device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the repeater device described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the repeater device described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The transmission component 804 may transmit a repeater leakage report that indicates one or more signal leakage metrics associated with the repeater device. The reception component 802 may receive an indication of gain configuration information that is associated with a respective gain configuration for each respective pass-through signal of one or more pass-through signals associated with the repeater device.

The communication manager 806 may apply the respective gain configuration for each respective pass-through signal, and repeat the one or more pass-through signals based at least in part on the respective gain configuration.

The reception component 802 may receive an instruction to perform a self-calibration procedure that generates self-calibration information. Alternatively, or additionally, the communication manager 806 may perform the self-calibration procedure.

In some aspects, the reception component 802 may receive an instruction to perform an assisted calibration procedure that is associated with generating assisted calibration information. The reception component 802 may receive a reference signal that is associated with the assisted calibration procedure, and/or the communication manager 806 may generate, as part of the assisted calibration procedure, the assisted calibration information based at least in part on the reference signal.

The reception component 802 may receive reference signal configuration information that is associated with the reference signal and generating the assisted calibration information is based at least in part on the reference signal configuration information.

The communication manager 806 may select the one or more signal leakage metrics from M signal leakage metrics based at least in part on each signal leakage metric of the one or more signal leakage metrics satisfying a threshold, where M is an integer.

The communication manager 806 may indicate, in the repeater leakage report, a respective beam pair for each signal leakage metric of the one or more signal leakage metrics.

The communication manager 806 may generate M signal leakage metrics.

The communication manager 806 may select, as the one or more signal leakage metrics, N signal leakage metrics that are associated with the N top-ranked values out of the M signal leakage metrics, where M is a first integer and N is a second integer.

The communication manager 806 may detect a reporting trigger event.

The communication manager 806 may select, based at least in part on the repeater leakage report, a first gain configuration for a first beam pair associated with a first pass-through signal of the one or more pass-through signals, and a second gain configuration for a second beam pair associated with a second pass-through signal of the one or more pass-through signals. In some aspects, selecting the first gain configuration and the second gain configuration is based at least in part on mitigating oscillation associated with the first beam pair and the second beam pair at the repeater device.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
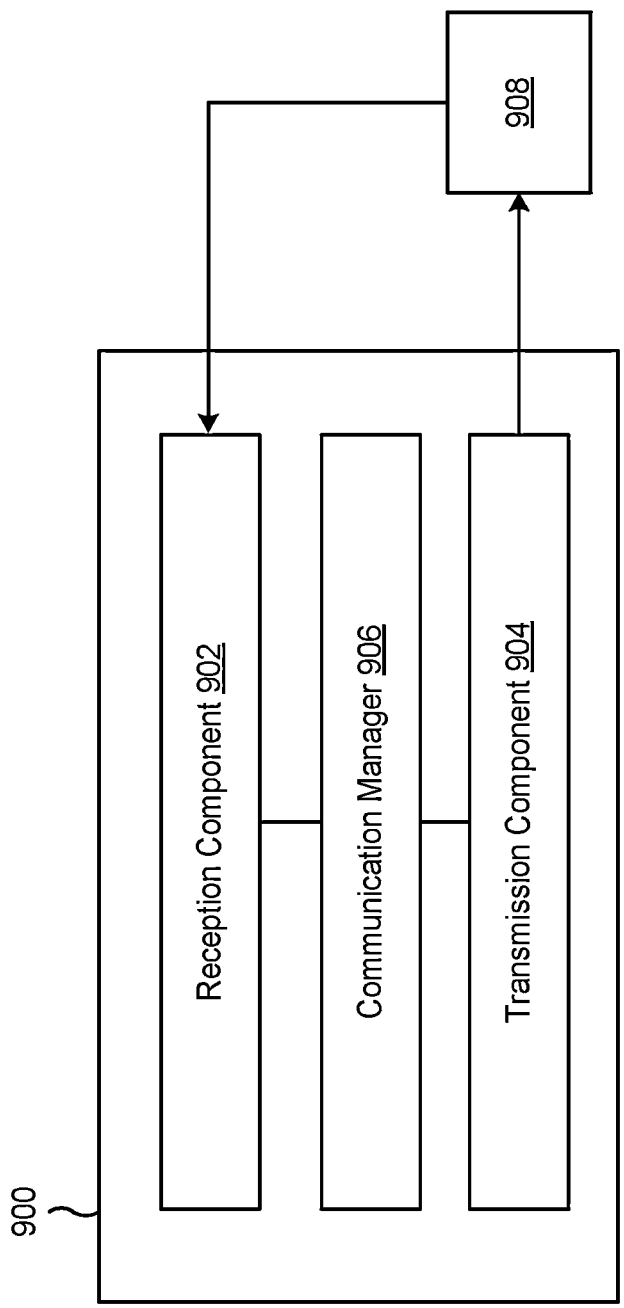
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 3-7. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive a repeater leakage report that indicates one or more signal leakage metrics associated with a repeater device. The transmission component 904 may transmit an indication of gain configuration information that is based at least in part on the repeater leakage report, the gain configuration information being associated with a respective gain configuration for one or more pass-through signals associated with the repeater device.

The transmission component 904 may transmit an instruction to perform a self-calibration procedure.

The transmission component 904 may transmit an instruction to perform an assisted calibration procedure based at least in part on a reference signal.

The transmission component 904 may transmit the reference signal.

The transmission component 904 may transmit reference signal configuration information that is associated with the reference signal.

The communication manager 906 may select, based at least in part on the repeater leakage report and as at least part of the gain configuration information, a first gain configuration for a first beam pair associated with a first pass-through signal of the one or more pass-through signals, and a second gain configuration for a second beam pair associated with a second pass-through signal of the one or more pass-through signals. In some aspects, the communication manager 906 may select the first gain configuration and the second gain configuration is based at least in part on mitigating oscillation associated with the first beam pair and the second beam pair at the repeater device.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a repeater device, comprising: transmitting a repeater leakage report that indicates one or more signal leakage metrics associated with the repeater device; and receiving an indication of gain configuration information that is associated with a respective gain configuration for each respective pass-through signal of one or more pass-through signals associated with the repeater device.

Aspect 2: The method of Aspect 1, further comprising: applying the respective gain configuration for each respective pass-through signal; and repeating the one or more pass-through signals based at least in part the respective gain configuration.

Aspect 3: The method of any of Aspects 1-2, wherein the repeater leakage report is based at least in part on at least one of: factory calibration information, self-calibration information, or assisted calibration information.

Aspect 4: The method of any of Aspects 1-3, further comprising: receiving an instruction to perform a self-calibration procedure that generates self-calibration information; and performing the self-calibration procedure.

Aspect 5: The method of Aspect 4, wherein the instruction to perform the self-calibration procedure indicates to perform the self-calibration procedure periodically, and wherein performing the self-calibration procedure comprises: performing the self-calibration procedure periodically to generate updated self-calibration information. Performing the self-calibration procedure may improve an accuracy of signal leakage metrics and/or error metrics and, subsequently, enable more accurate gain configurations to improve signal quality.

Aspect 6: The method of any of Aspects 1-5, further comprising: receiving an instruction to perform an assisted calibration procedure that is associated with generating assisted calibration information; receiving a reference signal that is associated with the assisted calibration procedure; and generating, as part of the assisted calibration procedure, the assisted calibration information based at least in part on the reference signal.

Aspect 7: The method of Aspect 6, further comprising: receiving reference signal configuration information that is associated with the reference signal, wherein generating the assisted calibration information is based at least in part on the reference signal configuration information.

Aspect 8: The method of Aspect 6, wherein the reference signal includes at least one of: a channel state information reference signal (CSI-RSI), or a sounding reference signal (SRS).

Aspect 9: The method of any of Aspects 1-8, wherein each signal leakage metric of the one or more signal leakage metrics is associated with a respective beam pair that includes at least a respective transmit beam and a respective receive beam.

Aspect 10: The method of any of Aspects 1-9, further comprising: selecting the one or more signal leakage metrics from M signal leakage metrics based at least in part on each signal leakage metric of the one or more signal leakage metrics satisfying a threshold, where M is an integer; and indicating, in the repeater leakage report, a respective beam pair for each signal leakage metric of the one or more signal leakage metrics.

Aspect 11: The method of any of Aspects 1-10, further comprising: generating M signal leakage metrics; and selecting, as the one or more signal leakage metrics, N signal leakage metrics that are associated with the N top-ranked values out of the M signal leakage metrics, where M is a first integer and N is a second integer.

Aspect 12: The method of any of Aspects 1-11, wherein transmitting the repeater leakage report comprises transmitting the repeater leakage report periodically.

Aspect 13: The method of any of Aspects 1-12, further comprising: detecting a reporting trigger event, wherein transmitting the repeater leakage report comprises: transmitting the repeater leakage report autonomously and based at least in part on detecting the reporting trigger event, and wherein transmitting the repeater leakage report comprises: transmitting the repeater leakage report autonomously and based at least in part on detecting the reporting trigger event.

Aspect 14: The method of Aspect 13, wherein the reporting trigger event is based at least in part on at least one of: a communication channel condition, or an operating condition associated with the repeater device.

Aspect 15: The method of Aspect 14, wherein the reporting trigger event is based at least in part on the operating condition, wherein the operating condition comprises at least one of: an operating temperature associated with the repeater device, or a change in the operating temperature associated with the repeater device.

Aspect 16: The method of any of Aspects 1-15, wherein the indication of the gain configuration information is a first indication, and the method further comprises: generating at least one Layer 1 signal metric based at least in part on a reference signal; and transmitting a second indication of the at least one Layer 1 signal metric.

Aspect 17: The method of Aspect 16, wherein the at least one Layer 1 signal metric comprises a received signal received power (RSRP) metric.

Aspect 18: The method of any of Aspects 1-17, wherein each signal leakage metric of the one or more signal leakage metrics is associated with a respective beam pair, and wherein the repeater leakage report indicates a respective maximum gain for each respective beam pair.

Aspect 19: The method of any of Aspects 1-18, further comprising: selecting, based at least in part on the repeater leakage report, a first gain configuration for a first beam pair associated with a first pass-through signal of the one or more pass-through signals, and a second gain configuration for a second beam pair associated with a second pass-through signal of the one or more pass-through signals, wherein selecting the first gain configuration and the second gain configuration is based at least in part on mitigating oscillation associated with the first beam pair and the second beam pair at the repeater device.

Aspect 20: The method of Aspect 19, wherein selecting the first gain configuration and the second gain configuration is based at least in part on at least one of the first pass-through signal or the second pass-through signal satisfying a signal quality threshold.

Aspect 21: The method of Aspect 19, wherein selecting the first gain configuration and the second gain configuration is based at least in part on at least one Layer 1 signal metric.

Aspect 22: The method of Aspect 21, wherein the at least one Layer 1 signal metric comprises a received signal received power (RSRP) metric.

Aspect 23: The method of Aspect 19, wherein the gain configuration information indicates at least one of: a first target signal-to-noise ratio (SNR) associated with the first pass-through signal, or a second target SNR associated with the second pass-through signal, and wherein selecting the first gain configuration and the second gain configuration is based at least in part on at least one of the first target SNR or the second target SNR.

Aspect 24: The method of Aspect 19, wherein selecting the first gain configuration and the second gain configuration is based at least in part on a first maximum gain associated with first beam pair, and wherein selecting the second gain configuration is based at least in part on a second maximum gain associated with the second beam pair.

Aspect 25: The method of Aspect 19, wherein the gain configuration information indicates a priority between at least the first pass-through signal and the second pass-through signal, and wherein selecting the first gain configuration and the second gain configuration is based at least in part on the priority.

Aspect 26: A method of wireless communication performed by a network node, comprising: receiving a repeater leakage report that indicates one or more signal leakage metrics associated with a repeater device; and transmitting an indication of gain configuration information that is based at least in part on the repeater leakage report, the gain configuration information being associated with a respective gain configuration for one or more pass-through signals associated with the repeater device.

Aspect 27: The method of Aspect 26, further comprising: transmitting an instruction to perform a self-calibration procedure.

Aspect 28: The method of Aspect 27, wherein the instruction to perform the self-calibration procedure indicates to perform the self-calibration procedure periodically.

Aspect 29: The method of any of Aspects 26-28, further comprising: transmitting an instruction to perform an assisted calibration procedure based at least in part on a reference signal.

Aspect 30: The method of Aspect 29, further comprising: transmitting the reference signal.

Aspect 31: The method of Aspect 29, further comprising: transmitting reference signal configuration information that is associated with the reference signal.

Aspect 32: The method of Aspect 29, wherein the reference signal comprises at least one of: a channel state information reference signal (CSI-RSI), or a sounding reference signal (SRS).

Aspect 33: The method of any of Aspects 26-32, wherein each signal leakage metric of the one or more signal leakage metrics is associated with a respective beam pair that includes at least a respective transmit beam and a respective receive beam.

Aspect 34: The method of any of Aspects 26-33, wherein each signal leakage metric of the one or more signal leakage metrics satisfies a threshold, and wherein the repeater leakage report indicates a respective beam pair for each signal leakage metric of the one or more signal leakage metrics.

Aspect 35: The method of any of Aspects 26-34 wherein receiving the repeater leakage report comprises receiving the repeater leakage report periodically.

Aspect 36: The method of any of Aspects 26-35, wherein receiving the repeater leakage report comprises receiving the repeater leakage report aperiodically.

Aspect 37: The method of any of Aspects 26-36 further comprising: selecting, based at least in part on the repeater leakage report and as at least part of the gain configuration information, a first gain configuration for a first beam pair associated with a first pass-through signal of the one or more pass-through signals, and a second gain configuration for a second beam pair associated with a second pass-through signal of the one or more pass-through signals, wherein selecting the first gain configuration and the second gain configuration is based at least in part on mitigating oscillation associated with the first beam pair and the second beam pair at the repeater device.

Aspect 38: The method of Aspect 37, wherein selecting the first gain configuration and the second gain configuration is based at least in part at least one of the first pass-through signal or the second pass-through signal satisfying a signal quality threshold.

Aspect 39: The method of Aspect 37, wherein the indication of the gain configuration information is a first indication, and the method further comprises: receiving a second indication of at least one Layer 1 signal metric that is associated with the repeater device, wherein selecting the first gain configuration and the second gain configuration is based at least in part on the at least one Layer 1 signal metric.

Aspect 40: The method of Aspect 39, wherein the at least one Layer 1 signal metric comprises a received signal received power (RSRP) metric.

Aspect 41: The method of Aspect 37, wherein selecting the first gain configuration and the second gain configuration is based at least in part on at least one of: a first target signal-to-noise ratio (SNR) associated with the first pass-through signal, or a second target SNR associated with the second pass-through signal.

Aspect 42: The method of Aspect 37, wherein each signal leakage metric of the one or more signal leakage metrics is associated with a respective beam pair of one or more beam pairs, wherein the repeater leakage report indicates a respective maximum gain for the respective beam pair, wherein selecting the first gain configuration is based at least in part on a first maximum gain associated with first beam pair, and wherein selecting the second gain configuration is based at least in part on a second maximum gain associated with the second beam pair.

Aspect 43: The method of Aspect 37, wherein selecting the first gain configuration is based at least in part on a first maximum gain associated with first beam pair, and wherein selecting the second gain configuration is based at least in part on a second maximum gain associated with the second beam pair.

Aspect 44: The method of Aspect 37, wherein selecting the first gain configuration and the second gain configuration is based at least in part on a priority between at least the first pass-through signal and the second pass-through signal.

Aspect 45: An apparatus for wireless communication at a device, comprising a processor; memory coupled with the processor; and instructions stored in the memory and executable by the processor to cause the apparatus to perform the method of one or more of Aspects 1-25.

Aspect 46: An apparatus for wireless communication at a device, comprising a processor; memory coupled with the processor; and instructions stored in the memory and executable by the processor to cause the apparatus to perform the method of one or more of Aspects 26-44.

Aspect 47: A device for wireless communication, comprising a memory and one or more processors coupled to the memory, the one or more processors configured to perform the method of one or more of Aspects 1-25.

Aspect 48: A device for wireless communication, comprising a memory and one or more processors coupled to the memory, the one or more processors configured to perform the method of one or more of Aspects 26-44.

Aspect 49: An apparatus for wireless communication, comprising at least one means for performing the method of one or more of Aspects 1-25.

Aspect 50: An apparatus for wireless communication, comprising at least one means for performing the method of one or more of Aspects 26-44.

Aspect 51: A non-transitory computer-readable medium storing code for wireless communication, the code comprising instructions executable by a processor to perform the method of one or more of Aspects 1-25.

Aspect 52: A non-transitory computer-readable medium storing code for wireless communication, the code comprising instructions executable by a processor to perform the method of one or more of Aspects 26-44.

Aspect 53: A non-transitory computer-readable medium storing a set of instructions for wireless communication, the set of instructions comprising one or more instructions that, when executed by one or more processors of a device, cause the device to perform the method of one or more of Aspects 1-25.

Aspect 54: A non-transitory computer-readable medium storing a set of instructions for wireless communication, the set of instructions comprising one or more instructions that, when executed by one or more processors of a device, cause the device to perform the method of one or more of Aspects 26-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a repeater device, comprising:
   a memory; and
   one or more processors, coupled to the memory, configured to:
      transmit a repeater leakage report that indicates one or more signal leakage metrics associated with the repeater device; and
      receive an indication of gain configuration information that is associated with a respective gain configuration for each respective pass-through signal of one or more pass-through signals associated with the repeater device.

2. The apparatus of claim 1, wherein the one or more processors are further configured to:
   apply the respective gain configuration for each respective pass-through signal; and
   repeat the one or more pass-through signals based at least in part on the respective gain configuration.

3. The apparatus of claim 1, wherein the one or more processors are further configured to:
   receive an instruction to perform a self-calibration procedure that generates self-calibration information; and
   perform the self-calibration procedure.

4. The apparatus of claim 1, wherein the one or more processors are further configured to:
   receive an instruction to perform an assisted calibration procedure that is associated with generating assisted calibration information;
   receive a reference signal that is associated with the assisted calibration procedure; and
   generate, as part of the assisted calibration procedure, the assisted calibration information based at least in part on the reference signal.

5. The apparatus of claim 1, wherein each signal leakage metric of the one or more signal leakage metrics is associated with a respective beam pair that includes at least a respective transmit beam and a respective receive beam.

6. The apparatus of claim 1, wherein the one or more processors are further configured to:
   select the one or more signal leakage metrics from M signal leakage metrics based at least in part on each signal leakage metric of the one or more signal leakage metrics satisfying a threshold, where M is an integer.

7. The apparatus of claim 1, wherein the one or more processors are further configured to:
   generate M signal leakage metrics; and
   select, as the one or more signal leakage metrics, N signal leakage metrics that are associated with N top-ranked values out of the M signal leakage metrics, where M is a first integer and N is a second integer.

8. The apparatus of claim 1, wherein the one or more processors, to transmit the repeater leakage report, are configured to transmit the repeater leakage report periodically.

9. The apparatus of claim 1, wherein the one or more processors are further configured to:
detect a reporting trigger event,
wherein the one or more processors, to transmit the repeater leakage report, are configured to:
transmit the repeater leakage report autonomously and based at least in part on detecting the reporting trigger event.

10. The apparatus of claim 1, wherein the one or more processors are further configured to:
generate at least one Layer 1 signal metric based at least in part on a reference signal; and
transmit a second indication of the at least one Layer 1 signal metric.

11. The apparatus of claim 1, wherein each signal leakage metric of the one or more signal leakage metrics is associated with a respective beam pair, and
wherein the repeater leakage report indicates a respective maximum gain for each respective beam pair.

12. The apparatus of claim 1, wherein the one or more processors are further configured to:
select, based at least in part on the repeater leakage report, a first gain configuration for a first beam pair associated with a first pass-through signal of the one or more pass-through signals, and a second gain configuration for a second beam pair associated with a second pass-through signal of the one or more pass-through signals,
wherein the one or more processors, to select the first gain configuration and the second gain configuration, are configured to:
select the first gain configuration and the second gain configuration, based at least in part on mitigating oscillation associated with the first beam pair and the second beam pair.

13. The apparatus of claim 12, wherein the gain configuration information indicates at least one of:
a first target signal-to-noise ratio (SNR) associated with the first pass-through signal, or
a second target SNR associated with the second pass-through signal, and
wherein the one or more processors, to select the first gain configuration and the second gain configuration, are configured to:
select the first gain configuration and the second gain configuration based at least in part on at least one of the first target SNR or the second target SNR.

14. The apparatus of claim 12, wherein the gain configuration information indicates a priority between at least the first pass-through signal and the second pass-through signal, and
wherein the one or more processors, to select the first gain configuration and the second gain configuration, are configured to:
select the first gain configuration and the second gain configuration based at least in part on the priority.

15. An apparatus for wireless communication at a network node, comprising:
a memory; and
one or more processors, coupled to the memory, configured to:
receive a repeater leakage report that indicates one or more signal leakage metrics associated with a repeater device; and
transmit an indication of gain configuration information that is based at least in part on the repeater leakage report, the gain configuration information being associated with a respective gain configuration for one or more pass-through signals associated with the repeater device.

16. The apparatus of claim 15, wherein the one or more processors are further configured to:
transmit an instruction to perform an assisted calibration procedure based at least in part on a reference signal.

17. The apparatus of claim 15, wherein each signal leakage metric of the one or more signal leakage metrics is associated with a respective beam pair that includes at least a respective transmit beam and a respective receive beam.

18. The apparatus of claim 15, wherein each signal leakage metric of the one or more signal leakage metrics satisfies a threshold, and
wherein the repeater leakage report indicates a respective beam pair for each signal leakage metric of the one or more signal leakage metrics.

19. The apparatus of claim 15, wherein the one or more processors are further configured to:
select, based at least in part on the repeater leakage report and as at least part of the gain configuration information, a first gain configuration for a first beam pair associated with a first pass-through signal of the one or more pass-through signals, and a second gain configuration for a second beam pair associated with a second pass-through signal of the one or more pass-through signals,
wherein the one or more processors, to select the first gain configuration and the second gain configuration, are configured to:
select the first gain configuration and the second gain configuration based at least in part on mitigating oscillation associated with the first beam pair and the second beam pair.

20. The apparatus of claim 19, wherein the one or more processors, to select the first gain configuration and the second gain configuration, are configured to:
select the first gain configuration and the second gain configuration is based at least in part at least one of the first pass-through signal or the second pass-through signal satisfying a signal quality threshold.

21. The apparatus of claim 19, wherein the one or more processors are further configured to:
receive a second indication of at least one Layer 1 signal metric that is associated with the repeater device,
wherein the one or more processors, to select the first gain configuration and the second gain configuration, are configured to:
select the first gain configuration and the second gain configuration is based at least in part on the at least one Layer 1 signal metric.

22. The apparatus of claim 19, wherein the one or more processors, to select the first gain configuration and the second gain configuration, are configured to:
select the first gain configuration and the second gain configuration based at least in part on at least one of:
a first target signal-to-noise ratio (SNR) associated with the first pass-through signal, or
a second target SNR associated with the second pass-through signal.

23. The apparatus of claim 19, wherein each signal leakage metric of the one or more signal leakage metrics is associated with a respective beam pair of one or more beam pairs,
   wherein the repeater leakage report indicates a respective maximum gain for the respective beam pair.

24. The apparatus of claim 19, wherein selecting the first gain configuration is based at least in part on a first maximum gain associated with first beam pair, and
   wherein selecting the second gain configuration is based at least in part on a second maximum gain associated with the second beam pair.

25. The apparatus of claim 19, wherein the one or more processors, to select the first gain configuration and the second gain configuration, are configured to:
   select the first gain configuration and the second gain configuration based at least in part on a priority between at least the first pass-through signal and the second pass-through signal.

26. A method of wireless communication performed by a repeater device, comprising:
   transmitting a repeater leakage report that indicates one or more signal leakage metrics associated with the repeater device; and
   receiving an indication of gain configuration information that is associated with a respective gain configuration for each respective pass-through signal of one or more pass-through signals associated with the repeater device.

27. The method of claim 26, further comprising:
   applying the respective gain configuration for each respective pass-through signal; and
   repeating the one or more pass-through signals based at least in part on respective gain configuration.

28. The method of claim 26, further comprising:
   detecting a reporting trigger event,
   wherein transmitting the repeater leakage report comprises:
      transmitting the repeater leakage report autonomously and based at least in part on detecting the reporting trigger event.

29. A method of wireless communication performed by a network node, comprising:
   receiving a repeater leakage report that indicates one or more signal leakage metrics associated with a repeater device; and
   transmitting an indication of gain configuration information that is based at least in part on the repeater leakage report, the gain configuration information being associated with a respective gain configuration for one or more pass-through signals associated with the repeater device.

30. The method of claim 29 further comprising:
   selecting, based at least in part on the repeater leakage report and as at least part of the gain configuration information, a first gain configuration for a first beam pair associated with a first pass-through signal of the one or more pass-through signals, and a second gain configuration for a second beam pair associated with a second pass-through signal of the one or more pass-through signals,
   wherein selecting the first gain configuration and the second gain configuration is based at least in part on mitigating oscillation associated with the first beam pair and the second beam pair at the repeater device.

* * * * *